(12) United States Patent
Wiemann et al.

(10) Patent No.: US 10,355,830 B2
(45) Date of Patent: Jul. 16, 2019

(54) UPLINK MAC PROTOCOL ASPECTS

(71) Applicant: Telefonaktiebolaget LM Ericsson (publ), Stockholm (SE)

(72) Inventors: Henning Wiemann, Aachen (DE); Mattias Tan Bergström, Stockholm (SE); Jung-Fu Cheng, Fremont, CA (US); Oskar Drugge, Hjärup (SE); Havish Koorapaty, Saratoga, CA (US); Henrik Sahlin, Mölnlycke (SE); Yu Yang, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 16 days.

(21) Appl. No.: 15/364,800

(22) Filed: Nov. 30, 2016

(65) Prior Publication Data

US 2017/0163388 A1    Jun. 8, 2017

Related U.S. Application Data

(60) Provisional application No. 62/264,075, filed on Dec. 7, 2015.

(51) Int. Cl.
*H04L 1/18* (2006.01)
*H04W 16/14* (2009.01)
(Continued)

(52) U.S. Cl.
CPC .......... *H04L 1/1861* (2013.01); *H04L 1/1822* (2013.01); *H04L 1/1851* (2013.01);
(Continued)

(58) Field of Classification Search
CPC .......................... H04W 72/042; H04W 72/005
(Continued)

(56) References Cited

U.S. PATENT DOCUMENTS

2015/0049708 A1*  2/2015  Damnjanovic ....... H04L 1/1812
                                                                 370/329
2015/0049709 A1   2/2015  Damnjanovic et al.
(Continued)

FOREIGN PATENT DOCUMENTS

WO   2012/167820 A1   12/2012
WO   2016/122397 A1    8/2016

OTHER PUBLICATIONS

Author Unknown, "Technical Specification Group Radio Access Network; Study on Licensed-Assisted Access to Unlicensed Spectrum; (Release 13)," Technical Report 36.889, Version 13.0.0, 3GPP Organizational Partners, Jun. 2015, 285 pages.
(Continued)

*Primary Examiner* — Iqbal Zaidi

(57) ABSTRACT

Methods of operation of a wireless device are provided. In particular, Media Access Control (MAC) protocol aspects are disclosed relating to Licensed Assisted Access (LAA) cells and, more generally, to cells of a cellular communications network operating in an unlicensed frequency spectrum. According to one aspect, a method of operation of a wireless device comprises transmitting an Uplink (UL) transmission on a cell for a corresponding UL Hybrid Automatic Repeat Request (HARQ) process, the cell operating in an unlicensed frequency spectrum, and setting a locally maintained status for the UL HARQ process to Acknowledgement (ACK) based on an assumption that the UL transmission was successful.

11 Claims, 25 Drawing Sheets

(51) Int. Cl.
*H04W 72/04* (2009.01)
*H04W 72/14* (2009.01)

(52) U.S. Cl.
CPC .......... *H04L 1/1854* (2013.01); *H04L 1/1887* (2013.01); *H04W 16/14* (2013.01); *H04W 72/0413* (2013.01); *H04W 72/0446* (2013.01); *H04W 72/14* (2013.01)

(58) Field of Classification Search
USPC .......................... 455/436–501; 370/252–339
See application file for complete search history.

(56) References Cited

U.S. PATENT DOCUMENTS

2015/0256316 A1    9/2015  Seo et al.
2017/0238320 A1*   8/2017  Fukuta .................. H04W 16/14
                                                           370/329

OTHER PUBLICATIONS

Author Unknown, "Technical Specification Group Radio Access Network; Evolved Universal Terrestrial Radio Access (E-UTRA); Medium Access Control (MAC) protocol specification (Release 12)," Technical Specification 36.321, Version 12.7.0, 3GPP Organizational Partners, Sep. 2015, 77 pages.
Ericsson, "R-xxxxxx: [DRAFT] UL LBT and Scheduling Designs," 3rd Generation Partnership Project (3GPP), MuLTEfire WG Radio Meeting #1, Dec. 8-10, 2015, 3 pages, New Jersey, USA.
Ericsson, "TSWG—2.#####: Physical layer design of PUCCH," 3rd Generation Partnership Project (3GPP), MuLTEfire WG Radio Meeting #2, Dec. 8-10, 2015, 3 pages, New Jersey, USA.
ZTE, "Overview on LAA UL" 3GPP Draft, R1-152970, May 16, 2015.
ZTE, "Consideration of LBT failure in LAA UL HARQ operation" 3GPP Draft, R1-164573, May 13, 2016.
Ericsson, "Discussion on UL HARQ handling in LAA", 3GPP TSG RAN WG1 Meeting #80, R1-150583, Feb. 9-13, 2015.

\* cited by examiner

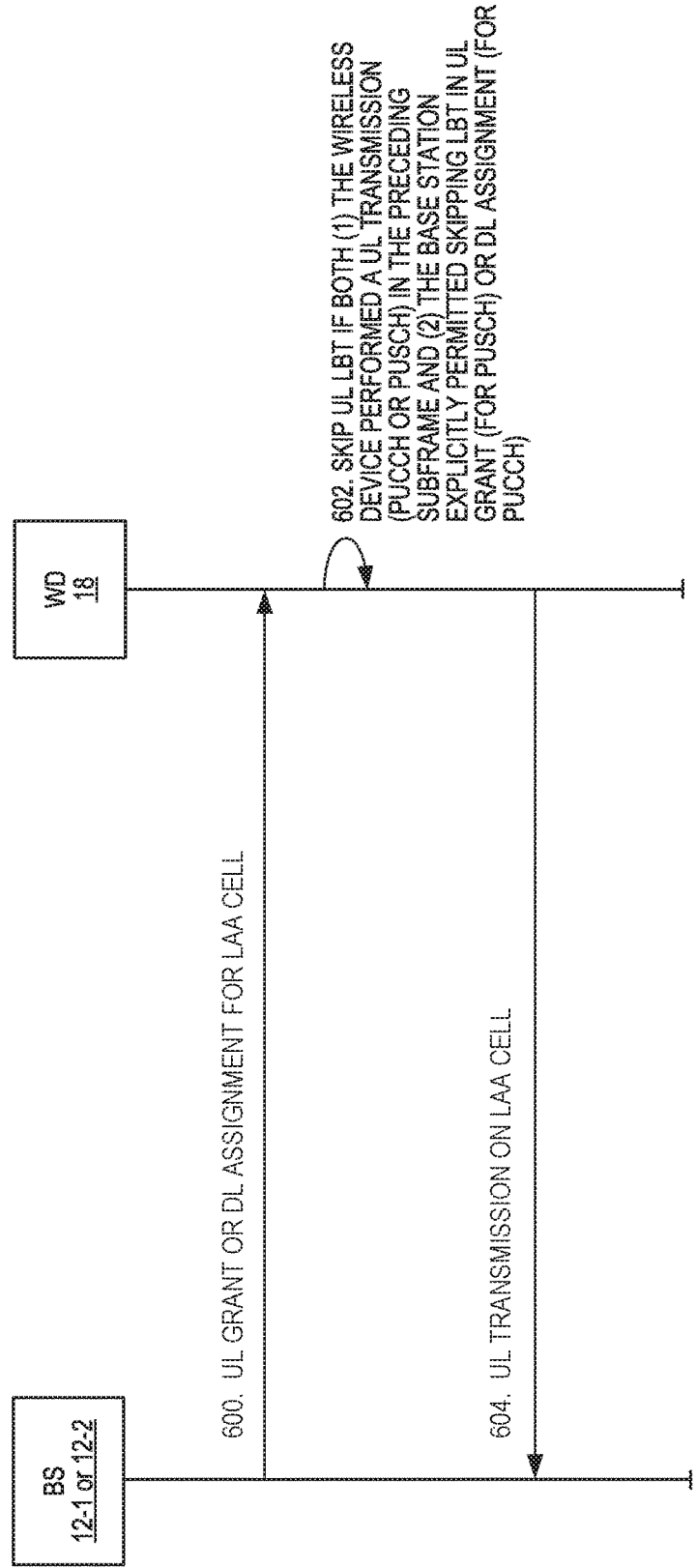

UPLINK MAC PROTOCOL ASPECTS

RELATED APPLICATIONS

This application claims the benefit of provisional patent application Ser. No. 62/264,075, filed Dec. 7, 2015, the disclosure of which is hereby incorporated herein by reference in its entirety.

TECHNICAL FIELD

This disclosure is related to uplink Medium Access Control (MAC) protocol aspects, i.e., the functionality for transmitting data on a shared Uplink (UL) channel (e.g., Physical Uplink Shared Channel (PUSCH)) as well as transmission of Hybrid Automatic Repeat Request (HARQ) Acknowledgement/Negative Acknowledgement (ACK/NACK) feedback and scheduling request on a UL control channel (e.g., Physical Uplink Control Channel (PUCCH)) or on a shared UL channel (e.g., PUSCH).

BACKGROUND

Licensed Assisted Access (LAA) facilitates Third Generation Partnership Project (3GPP) Long Term Evolution (LTE) equipment to operate in the unlicensed 5 gigahertz (GHz) radio spectrum. The unlicensed 5 GHz spectrum is used as a complement to the licensed spectrum. Devices can connect in the licensed spectrum (using a Primary Cell (PCell)) and use Carrier Aggregation (CA) to benefit from additional transmission capacity in the unlicensed spectrum (using a Secondary Cell (SCell)). To reduce the changes involved for aggregating licensed and unlicensed spectrum, the LTE frame timing in the PCell is simultaneously used in the SCell.

Regulatory requirements, however, may not permit transmissions in the unlicensed spectrum without prior channel sensing. Since the unlicensed spectrum must be shared with other radios of similar or dissimilar wireless technologies, a so called Listen-Before-Talk (LBT) procedure needs to be applied. Today, the unlicensed 5 GHz spectrum is mainly used by equipment implementing the Institute of Electrical and Electronics Engineers (IEEE) 802.11 Wireless Local Area Network (WLAN) standard. This standard is known under its marketing brand "Wi-Fi." In many regions there is also a constraint on the maximum duration of a single transmission burst in the unlicensed spectrum, such as 4 milliseconds (ms) or 10 ms.

1. LTE

FIG. 1A illustrates a basic LTE downlink physical resource grid. LTE uses Orthogonal Frequency Division Multiplexing (OFDM) in the downlink and Discrete Fourier Transform (DFT) spread OFDM (DFT-spread OFDM), which is also referred to as single-carrier Frequency Division Multiple Access (FDMA), in the Uplink (UL). The basic LTE downlink physical resource can thus be seen as a time-frequency grid as illustrated in FIG. 1A, where each resource element corresponds to one OFDM subcarrier during one OFDM symbol interval. The duration of each symbol is approximately 71.4 microseconds (μs). The UL subframe has the same subcarrier spacing as the Downlink (DL) and the same number of Single Carrier FDMA (SC-FDMA) symbols in the time domain as OFDM symbols in the DL.

FIG. 1B illustrates an LTE radio frame. In the time domain, LTE DL transmissions are organized into radio frames of 10 ms, each radio frame consisting of ten equally-sized subframes of length $T_{SUBFRAME}=1$ ms as shown in FIG. 1B. For normal cyclic prefix, one subframe consists of 14 OFDM symbols. A subframe is divided into two 0.5 ms slots. For normal cyclic prefix, each slot consists of 7 OFDM symbols. Furthermore, the resource allocation in LTE is typically described in terms of resource blocks, where a resource block corresponds to one 0.5 ms slot in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

FIG. 1C illustrates an example LTE 1.0 ms subframe (with 14 OFDM symbols) showing the locations of control signals and reference signals. DL transmissions are dynamically scheduled, i.e., in each subframe the base station transmits control information about which terminals data is transmitted to and upon which resource blocks the data is transmitted, in the current DL subframe. This control signalling is typically transmitted in the first 1, 2, 3, or 4 OFDM symbols in each subframe and the number n=1, 2, 3, or 4 is known as the Control Format Indicator (CFI). The DL subframe also contains common reference symbols, which are known to the receiver and used for coherent demodulation of, e.g., the control information. A DL system with CFI=3 OFDM symbols as control is illustrated in FIG. 1C.

From LTE Release 11 (Rel-11) onwards, the above described resource assignments can also be scheduled on the enhanced Physical Downlink Control Channel (EPDCCH). For LTE Rel-8 to Rel-10, only the Physical Downlink Control Channel (PDCCH) is available. The reference symbols shown in FIG. 1C are the Cell specific Reference Symbols (CRSs) and are used to support multiple functions including fine time and frequency synchronization and channel estimation for certain transmission modes.

1.1 PDCCH and EPDCCH

The PDCCH/EPDCCH is used to carry Downlink Control Information (DCI) such as scheduling decisions and power control commands. More specifically, the DCI includes:

- DL scheduling assignments, including Physical Downlink Shared Channel (PDSCH) resource indication, transport format, Hybrid Automatic Repeat Request (HARQ) information, and control information related to spatial multiplexing (if applicable). A DL scheduling assignment also includes a command for power control of the Physical Uplink Control Channel (PUCCH) used for transmission of HARQ acknowledgements in response to DL scheduling assignments.
- UL scheduling grants, including Physical Uplink Shared Channel (PUSCH) resource indication, transport format, and HARQ-related information. A UL scheduling grant also includes a command for power control of the PUSCH.
- Power control commands for a set of terminals as a complement to the commands included in the scheduling assignments/grants.

One PDCCH/EPDCCH carries one DCI message containing one of the groups of information listed above. As multiple terminals can be scheduled simultaneously, and each terminal can be scheduled on both DL and UL simultaneously, there must be a possibility to transmit multiple scheduling messages within each subframe. Each scheduling message is transmitted on separate PDCCH/EPDCCH resources, and consequently there are typically multiple simultaneous PDCCH/EPDCCH transmissions within each subframe in each cell. Furthermore, to support different radio channel conditions, link adaptation can be used, where the code rate of the (E)PDCCH is selected by adapting the resource usage for the (E)PDCCH, to match the radio channel conditions.

1.2 CA

FIG. 2 illustrates an example of CA. The LTE Rel-10 standard supports bandwidths larger than 20 megahertz (MHz). One important aspect of LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments, it can be expected that there will be a smaller number of LTE Rel-10-capable terminals compared to many LTE legacy terminals. Therefore, it is necessary to ensure an efficient use of a wide carrier also for legacy terminals, i.e. that it is possible to implement carriers where legacy terminals can be scheduled in all parts of the wideband LTE Rel-10 carrier. The straightforward way to obtain this would be by means of CA. CA implies that an LTE Rel-10 terminal can receive multiple CCs, where the CCs have, or at least have the possibility to have, the same structure as a Rel-8 carrier. CA is illustrated in FIG. 2. A CA-capable User Equipment device (UE) is assigned a PCell which is always activated, and one or more SCells which may be activated or deactivated dynamically.

The number of aggregated CCs as well as the bandwidth of the individual CC may be different for UL and DL. A symmetric configuration refers to the case where the number of CCs in DL and UL is the same, whereas an asymmetric configuration refers to the case that the number of CCs is different. It is important to note that the number of CCs configured in a cell may be different from the number of CCs seen by a terminal: A terminal may for example support more DL CCs than UL CCs, even though the cell is configured with the same number of UL and DL CCs.

In addition, a key feature of CA is the ability to perform cross-carrier scheduling. This mechanism allows a (E)PDCCH on one CC to schedule data transmissions on another CC by means of a 3-bit Carrier Indicator Field (CIF) inserted at the beginning of the (E)PDCCH messages. For data transmissions on a given CC, a UE expects to receive scheduling messages on the (E)PDCCH on just one CC— either the same CC, or a different CC via cross-carrier scheduling; this mapping from (E)PDCCH to PDSCH is also configured semi-statically. Note that cross-subframe cross-carrier scheduling of PDSCH is not supported in Rel-11 CA, i.e., the (E)PDCCH grant in a particular subframe applies to a PDSCH allocation in that same Transmit Time Interval (TTI).

2. WLAN

FIG. 3 is a general illustration of an LBT mechanism. In typical deployments of WLAN, Carrier Sense Multiple Access with Collision Avoidance (CSMA/CA) is used for medium access. The channel is sensed to perform a Clear Channel Assessment (CCA), and a transmission is initiated only if the channel is declared idle. If the channel is declared busy, the transmission is essentially deferred until the channel is deemed to be idle. When the range of several Access Points (APs) using the same frequency overlap, transmissions related to one AP might be deferred in case a transmission on the same frequency to or from another AP which is within range can be detected. If several APs are within range, they will have to share the channel in time, and the throughput for the individual APs may be severely degraded.

3. LAA to Unlicensed Spectrum Using LTE

Up to now, the spectrum used by LTE is dedicated to LTE (i.e., licensed spectrum). This has the advantage that the LTE system does not need to care about the coexistence issue and the spectrum efficiency can be maximized. However, the spectrum allocated to LTE is limited and, as such, cannot meet the ever increasing demand for larger throughput from applications/services. Therefore, a new study item has been initiated in 3GPP on extending LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi, as Wi-Fi will not transmit once it detects the channel is occupied.

Furthermore, one way to utilize the unlicensed spectrum reliably is to transmit essential control signals and channels on a licensed carrier. That is, a UE is connected to a PCell in the licensed band and one or more SCells in the unlicensed band. As used herein, an SCell in unlicensed spectrum is denoted as an LAA SCell. In the case of cross-carrier scheduling, PDSCH and PUSCH grants for the LAA SCell are transmitted on the PCell.

Another way to utilize the unlicensed spectrum is to utilize standalone LAA cells.

SUMMARY

This disclosure is related to uplink Medium Access Control (MAC) protocol aspects, i.e., the functionality for transmitting data on a shared Uplink (UL) channel (e.g., Physical Uplink Shared Channel (PUSCH)) as well as transmission of Hybrid Automatic Repeat Request (HARQ) Acknowledgement/Negative Acknowledgement (ACK/NACK) feedback and scheduling request on a UL control channel (e.g., Physical Uplink Control Channel (PUCCH)) or on a shared UL channel (e.g., PUCCH). In particular, MAC protocol aspects are disclosed herein relating to Licensed Assisted Access (LAA) cells and, more generally, to cells of a cellular communications network operating in an unlicensed frequency spectrum.

According to one aspect, a method of operation of a wireless device comprises transmitting a UL transmission on a cell for a corresponding UL HARQ process, the cell operating in an unlicensed frequency spectrum, and setting a locally maintained status for the UL HARQ process to "ACK" based on an assumption that the UL transmission was successful. In one embodiment, the method further comprises performing a retransmission for the uplink HARQ process only upon reception of a corresponding UL grant with a New Data Indicator (NDI) not toggled.

According to another aspect, a method of operation of a wireless device comprises determining whether the wireless device has a valid UL grant in a subframe on a cell, the cell operating in an unlicensed frequency spectrum, and starting a UL HARQ feedback timer upon determining that the wireless device has a valid UL grant in the subframe on the cell. In one embodiment, the UL HARQ feedback timer is started whether the wireless device performs a corresponding UL transmission or whether the corresponding UL transmission is blocked by a Listen-Before-Talk (LBT) scheme. In one embodiment, the method further comprises starting a Discontinuous Reception (DRX) retransmission timer upon expiry of the UL HARQ feedback timer. In one embodiment, the method further comprises remaining in DRX active time as long as the DRX retransmission timer is running. In one embodiment, the method further comprises stopping the UL HARQ feedback timer upon flushing a corresponding HARQ buffer. In one embodiment, one uplink HARQ Round Trip Time (RTT) timer and one DRX retransmission timer are maintained per UL HARQ process.

According to another aspect, a method of operation of a wireless device comprises transmitting Uplink Control Information (UCI) on a cell operating in an unlicensed frequency spectrum, the UCI comprising HARQ feedback information for one or more Downlink (DL) HARQ processes, and identifiers that identify the one or more DL HARQ processes. In one embodiment, the one or more DL HARQ processes are identified by an explicit identifier or by a bitmap wherein each bit corresponds to one of the one or more DL HARQ processes. In one embodiment, the method further comprises receiving feedback control information from a base station serving the cell, the feedback control information comprising an indication of whether bundling of the DL HARQ feedback in a UCI is to be performed. In one embodiment, the feedback control information further comprises information that indicates a number of DL HARQ feedbacks that the wireless device is to bundle in a UCI.

According to another aspect, a method operation of a wireless device in a network having a primary serving cell and a secondary serving cell comprises: in response to receiving a DL transmission from a primary serving cell, providing a HARQ feedback to the primary serving cell, and in response to receiving a DL transmission from a secondary serving cell, providing a HARQ feedback to the secondary serving cell instead of to the primary serving cell. In some embodiments, each UL serving cell carries HARQ feedback for a corresponding DL serving cell.

According to another aspect, a method of operation of a wireless device comprises determining whether the wireless device has a valid UL grant in a subframe on a cell, the cell operating in an unlicensed frequency spectrum; upon determining that the wireless device has a valid UL grant, multiplexing pending HARQ feedback onto a UL shared channel; and upon determining that the wireless device does not have a valid UL grant, sending pending DL HARQ feedback on a UL control channel upon a successful short LBT operation. In one embodiment, the UL control channel is a long UL control channel.

According to another aspect, a method of operation of a wireless device comprises skipping UL LBT before a UL transmission in a subframe on a cell operating in an unlicensed frequency spectrum if both the wireless device performed a UL transmission in a preceding subframe and the wireless device received an explicit indication that skipping UL LBT is permitted. In one embodiment, the UL transmission in the preceding subframe was a PUSCH transmission. In one embodiment, the UL transmission in the preceding subframe was a long PUCCH transmission.

According to another aspect, a method of operation of a wireless device comprises performing a UL LBT operation at the beginning of a UL subframe rather than at the end of the preceding subframe.

According to another aspect, a method of operation of a wireless device comprises sending pending HARQ feedback on a short UL control channel on a cell operating in an unlicensed frequency spectrum if the wireless device has received an indication of a shortened DL subframe. In one embodiment, the wireless device does not need to perform LBT prior to sending the pending HARQ feedback on the short UL control channel. In one embodiment, the method further comprises determining short UL control channel resources on which to send the pending HARQ feedback. In one embodiment, the wireless device determines the short UL control channel resources based on the Radio Resource Control (RRC) configuration and information contained within a DL assignment.

Those skilled in the art will appreciate the scope of the present disclosure and realize additional aspects thereof after reading the following detailed description of the embodiments in association with the accompanying drawing figures.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 18 illustrates the operation of a base station and a wireless device to implement proposal 13 according to some embodiments of the present disclosure;

DETAILED DESCRIPTION

Figure 1A:
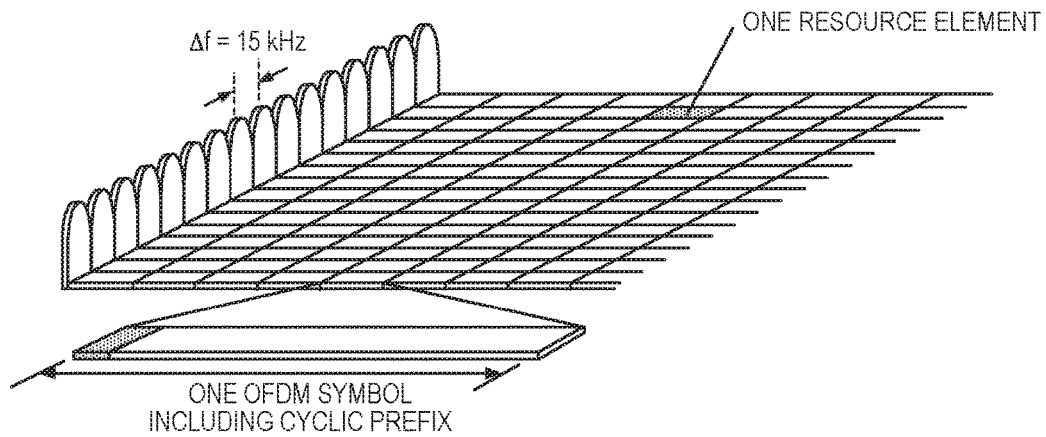
FIG. 1A illustrates a conventional example Orthogonal Frequency Division Multiplexing (OFDM) Downlink (DL) physical resource grid used by Long Term Evolution (LTE)
Figure 1B:
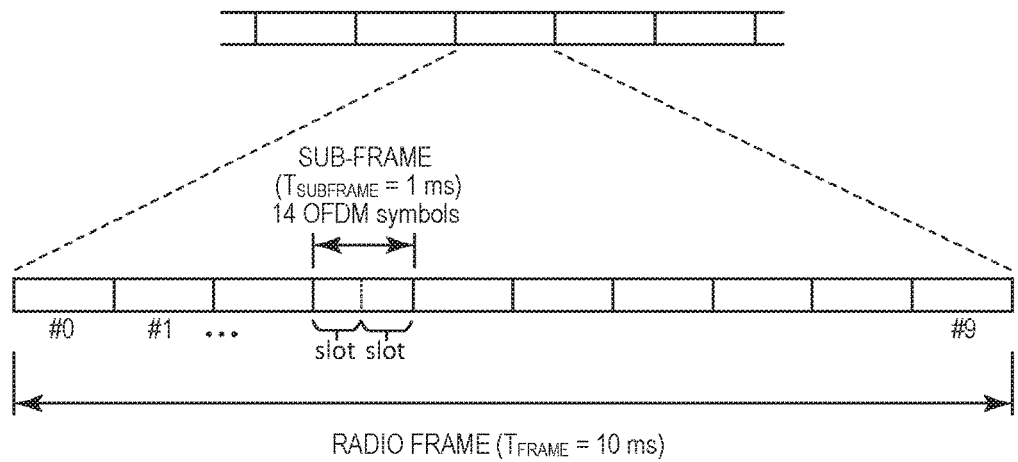
FIG. 1B illustrates a conventional LTE radio frame showing the OFDM time-domain structure.
Figure 1C:
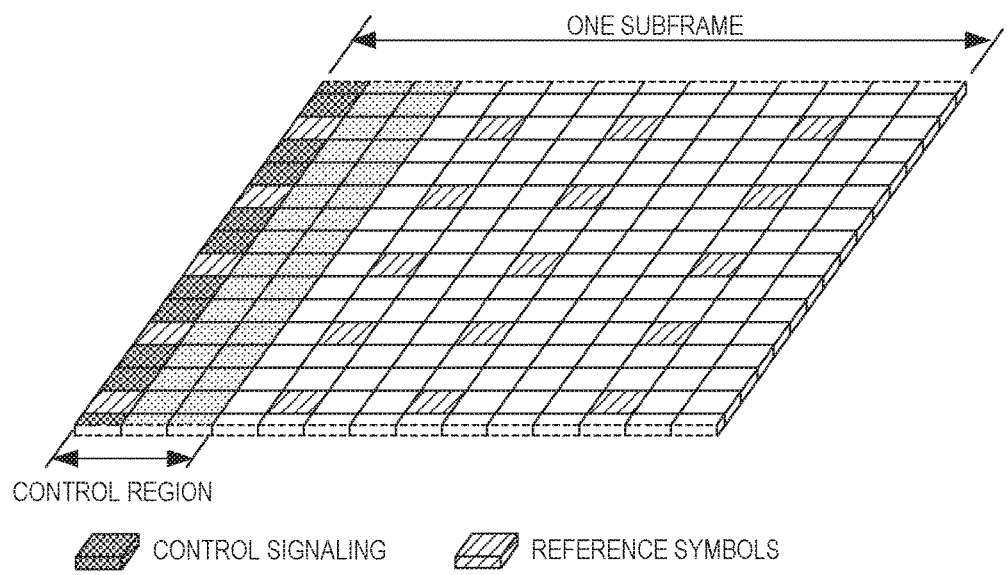
FIG. 1C illustrates an example LTE 1.0 ms OFDM DL subframe (with 14 OFDM symbols) showing the locations of control signals and reference signals.
Figure 2:
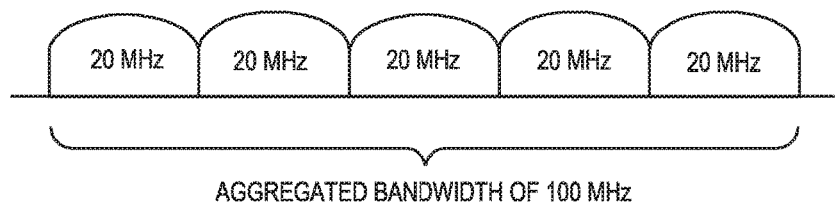
FIG. 2 is a schematic diagram of an example of Carrier Aggregation (CA)
Figure 3:
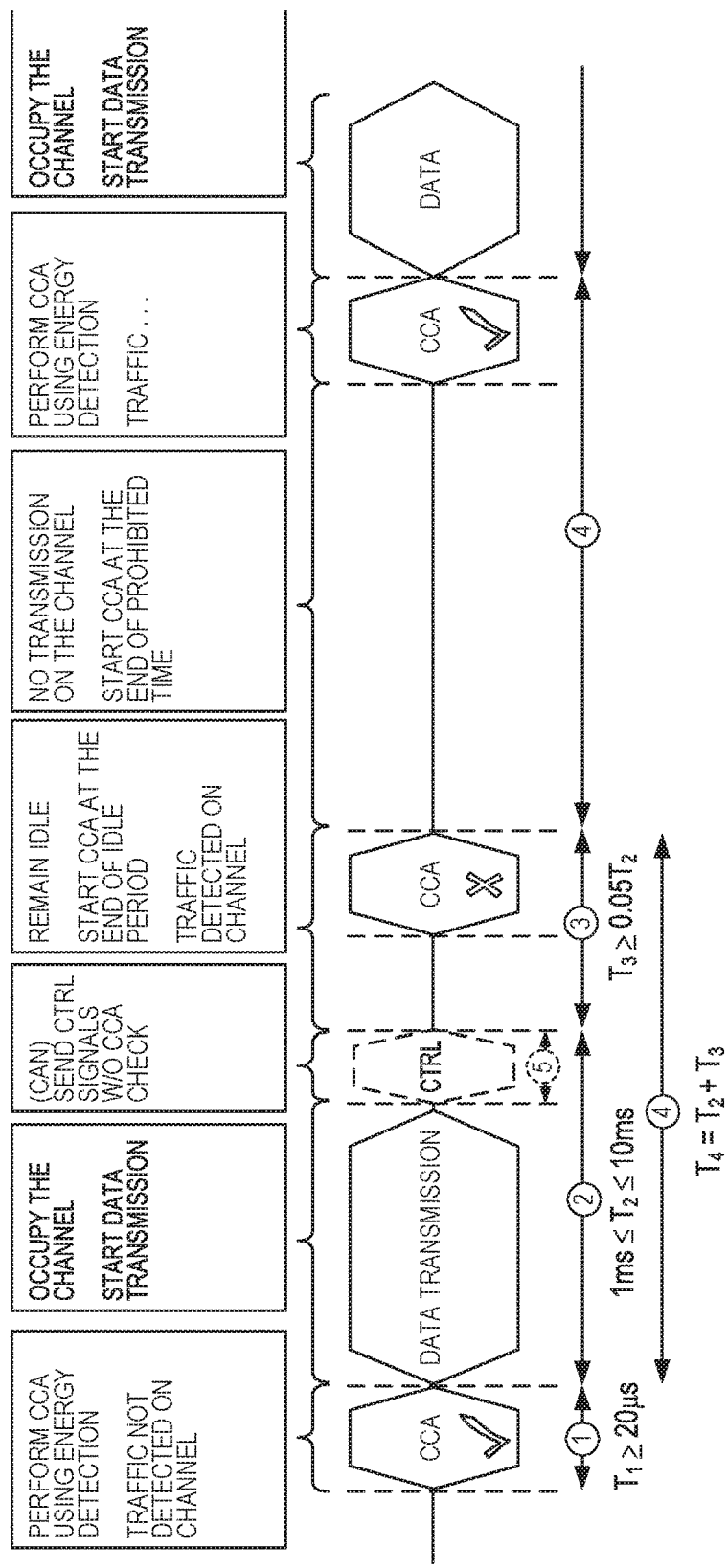
FIG. 3 is a schematic diagram showing of a Listen-Before-Talk (LBT) scheme.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP LTE network and a Machine Type Communication (MTC) device.

Network Node: As used herein, a "network node" is any node that is either part of the radio access network or the core network of a cellular communications network/system.

Listen-Before-Talk (LBT): As used herein, "LBT" or an "LBT scheme" is any scheme in which a radio access node or wireless device monitors a channel in an unlicensed frequency spectrum to determine whether the channel is clear (e.g., performs a Clear Channel Assessment (CCA)) before transmitting on the channel.

LBT Cell: As used herein, an "LBT cell" is a cell that operates on a channel in an unlicensed frequency spectrum in which an LBT scheme must be performed before transmitting.

Licensed Assisted Access (LAA) Secondary Cell (SCell): As used herein, an "LAA SCell" is one type of LBT cell. In particular, an "LAA SCell" is an SCell in a LTE network, where the SCell operates in an unlicensed frequency spectrum, with the assistance from another cell (i.e., Primary Cell (PCell)) operating in a licensed frequency spectrum.

Standalone LBT Cell: As used herein, a "standalone LBT cell" is one type of LBT cell (e.g., a cell in an LTE network) that operates on its own without the assistance from another cell operating in a licensed frequency spectrum. Note the description given herein focuses on 3GPP LTE and, as such, 3GPP LTE terminology is oftentimes used. However, the concepts disclosed herein are not limited to 3GPP LTE.

Note that, in the description herein, reference is made to the term "cell"; however, particularly with respect to Fifth Generation (5G) concepts, beams may be used instead of cells and, as such, it is important to note that the concepts described herein are equally applicable to both cells and beams. Thus, in some embodiments, the transmissions described herein may be performed on beams rather than cells (e.g., a beam in an unlicensed frequency spectrum).

In this disclosure the Uplink (UL) related Medium Access Control (MAC) protocol aspects, i.e., the functionality required for transmitting data on the Physical Uplink Shared Channel (PUSCH) as well as transmission of Hybrid Automatic Repeat Request (HARQ) Acknowledgement/Negative Acknowledgement (ACK/NACK) feedback and scheduling request on the Physical Uplink Control Channel (PUCCH) or PUSCH is investigated.

Realization of PUCCH on the Physical Layer

In the present disclosure, the physical layer design of PUCCH for standalone LTE in Unlicensed Spectrum (LTE-U) operation is provided. Two options, short PUCCH (sPUCCH) and long PUCCH design, are described from physical layer perspective. The MAC protocol design of HARQ feedback and Scheduling Request (SR) on PUCCH will be discussed below The Uplink Control Information (UCI) including HARQ-ACK, SR, and periodic Channel State Information (CSI) can be transmitted on PUCCH in 3GPP LTE. For standalone operation in unlicensed band, two PUCCH formats can be considered for UCI transmission depending on eNB timing configuration and HARQ protocol, as will be described below. It should be noted that it is beneficial that each UL serving cell carries the HARQ feedback for the corresponding DL serving cell in standalone LTE-U. This avoids the channel status of one cell determining the HARQ-ACK feedbacks of all cells. This approach is different from LTE where typically the PUCCH of the PCell carries the UCI for all SCells. However, in terms of channel utilization and PUCCH format design, it is suggested to have independent PUCCH for each standalone carrier.

Short PUCCH (sPUCCH)

A sPUCCH occupies 1-3 Single Carrier Frequency Division Multiple Access (SC-FDMA)/Orthogonal Frequency Division Multiplexing (OFDM) symbols in time domain, and spans the whole bandwidth by interlacing. As sPUCCH can be transmitted in the end of a DL partial subframe or as a part of a UL subframe (at least if the PUSCH is scheduled to the same UE). In order to transmit sPUCCH, an aggressive LBT may be applied at UE. Alternatively, no LBT is required if sPUCCH duration is below 5% of the duty cycle according to regulatory requirements.

Figure 4A:
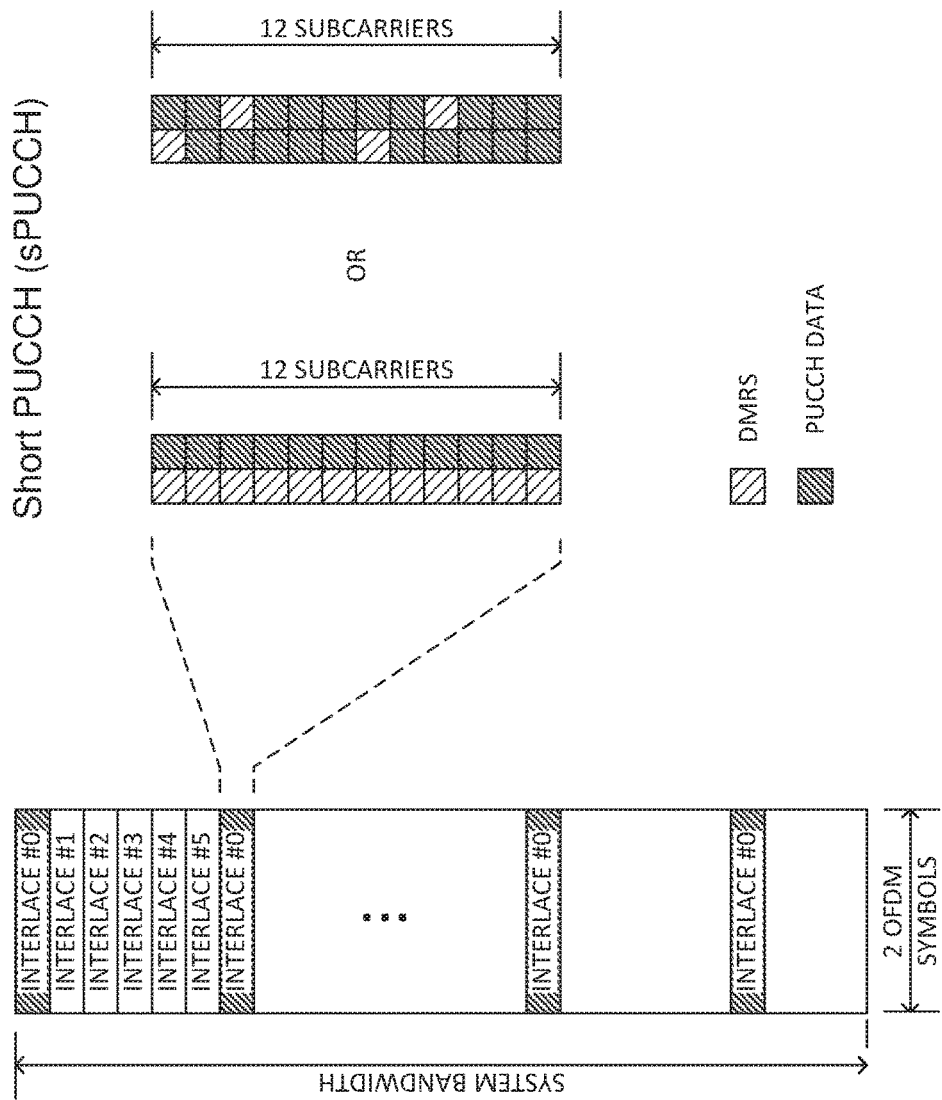
FIG. 4A depicts an exemplary short Physical Uplink Control Channel (PUCCH) according to some embodiments of the subject matter described herein.

FIG. 4A depicts an exemplary sPUCCH according to an embodiment of the subject matter described herein. In the embodiment illustrated in FIG. 4A, the PUCCH occupies 2 SC-FDMA/OFDM symbols in time and one interlace in frequency domain. The Demodulation Reference Signal (DMRS) and data symbol for PUCCH can be frequency multiplexed or time multiplexed as illustrated in the figure as two options. Multiple PUCCH UEs can be multiplexed in the frequency domain by assigning different interlacing patterns and/or in the code domain by applying, for example, different Orthogonal Cover Codes (OCCs) within a single interlace. The number of symbols, interlacing patterns, and OCC configuration (if any) can be configured for a UE by eNB signalling.

The HARQ feedback and the corresponding process Identifiers (IDs) could either be listed explicitly or, e.g., be provided as a bitmap (one or two bits per process). To align the design with 3GPP Release 13 (Rel-13) Carrier Aggregation (CA), the UCI on sPUCCH is attached with an 8-bit Cyclic Redundancy Check (CRC) and encoded using Tail Biting Convolutional Code (TBCC). The encoded symbols are mapped to available Resource Elements (REs) in a frequency first time second manner.

Long PUCCH

A long PUCCH occupies a full subframe in time domain, and spans the whole bandwidth by interlacing. A long PUCCH can be explicitly scheduled by eNB where LBT is required at UE to get access to the UL channel. The long PUCCH is compatible and can be multiplexed with PUSCH transmission from the same or different UEs.

Figure 4B:
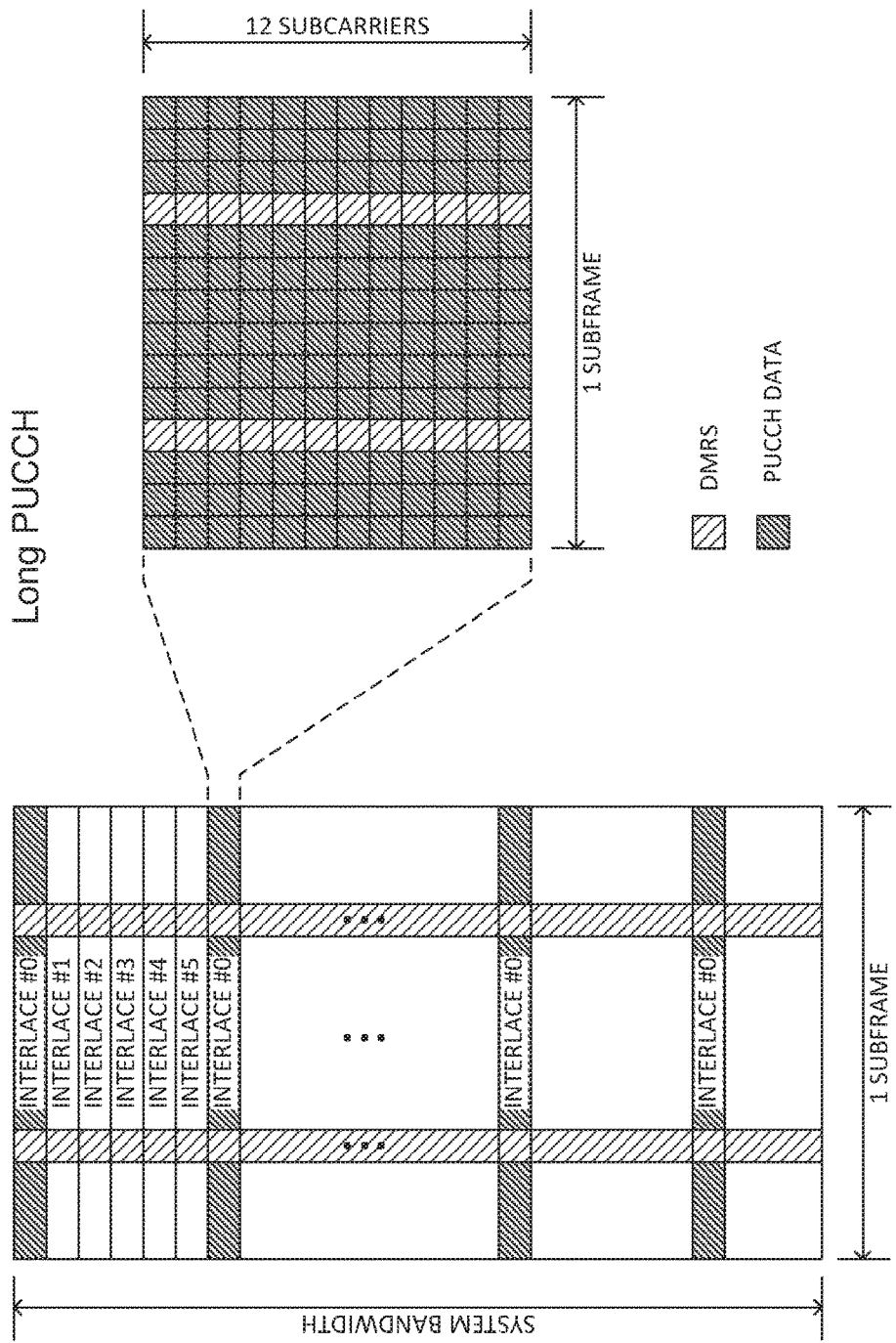
FIG. 4B depicts an exemplary long PUCCH according to some embodiments of the subject matter described herein.

FIG. 4B depicts an exemplary long PUCCH according to an embodiment of the subject matter described herein. In the embodiment illustrated in FIG. 4B, the PUCCH occupies one interlace in one subframe. There is one DMRS per slot occupying the whole bandwidth in frequency, which can be multiplexed with PUSCH DMRS by applying different cyclic shifts. Similar to sPUCCH, multiple PUCCH UEs can be multiplexed in the frequency domain by assigning different interlacing patterns and/or in the code domain by applying, for example, different OCCs within a single interlace. The remaining interlaces within the same subframe can be used for PUSCH transmission and PUCCH/PUSCH transmission from other UEs. The interlace pattern, cyclic shift (CS), and OCC configuration (if any) can be configured for a UE by eNB signalling.

Similarly as sPUCCH, the HARQ feedback and the corresponding process IDs could either be listed explicitly or, e.g., be provided as a bitmap (one or two bits per process) on long PUCCH.1 The UCI on long PUCCH is attached with an 8-bit CRC and encoded using TBCC. The encoded symbols are mapped to available REs in a frequency first time second manner.

In 3GPP LTE, the UCI transmission on PUCCH includes HARQ-ACK, SR and periodic CSI. For standalone LTE-U, it would be difficult to support periodic CSI and hence aperiodic CSI feedback is more essential and should be supported on PUSCH scheduled by UL grant with or without UL Shared Channel (UL-SCH) data. If more than one UCI type is transmitted on PUCCH, e.g. HARQ and SR in the same subframe, they are concatenated, jointly encoded and sent on either sPUCCH or long PUCCH format according to the eNB configuration based on DL HARQ protocol as will be described below.

Uplink Listen-Before-Talk Algorithms

Rel-13 LAA UL LBT

Several aspects of UL LBT were discussed during Rel-13. With regard to the framework of UL LBT, the discussion focused on the self-scheduling and cross-carrier scheduling scenarios.

It was recognized that UL LBT imposes an additional LBT step for UL transmissions with self-scheduling, since the UL grant itself requires a DL LBT by the eNB. Therefore, Rel-13 LAA recommends that the UL LBT for self-scheduling should use either a single CCA duration of at least 25 μs (similar to a DL Dedicated Reference Signal (DRS)), or a random backoff scheme with a defer period of 25 μs including a defer duration of 16 μs followed by one CCA slot, and a maximum contention window size chosen from X={3, 4, 5, 6, 7}. These options are also applicable for cross-carrier scheduling of UL by another unlicensed SCell.

A short UL LBT procedure for the case involving cross-carrier scheduling by a licensed PCell remains open for further study. The other option on the table is a full-fledged random backoff procedure similar to that used by Wi-Fi stations.

Finally, the case of UL transmissions without LBT when a UL transmission burst follows a DL transmission burst on that respective carrier (with a gap of at most 16 μs between the two bursts) was left open for further study in Rel-14.

Standalone UL LBT Algorithm

It is essential that the standalone UL LBT design is compatible with prospective UL LAA LBT algorithms specified in Rel-14 LAA. Furthermore, the UL channel access needs to be competitive when compared to the downlink. These aspects lead to the following proposals. Thus, the present disclosure proposes to retain the Rel-13 LAA UL LBT options as a basis for further study and proposes that the UL CCA Energy Detection (CCA-ED) threshold be at least as high as the DL CCA-ED threshold.

UL Grant Transmission

In legacy UL grant transmission, each UL subframe is scheduled by a dedicated grant sent 4 ms earlier. This leads to a high signalling overhead since 4 consecutive subframes with a UL grant are needed to indicate a single 4 ms UL burst, as seen in FIG. 5A.

Figure 5A:
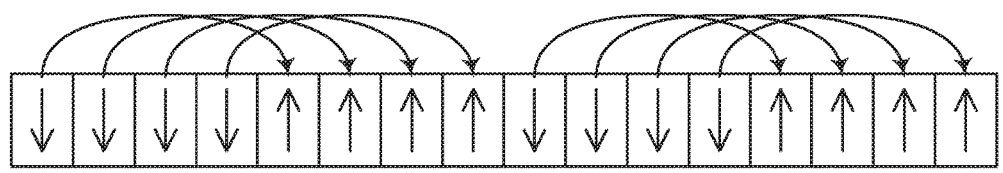
FIG. 5A depicts a high signalling overhead required for Uplink (UL) bursts using legacy UL grant transmission methods.

FIG. 5A depicts the high signalling overhead required for UL bursts using legacy UL grant transmission methods. At low loads, this further implies that DL LBT would need to be performed just to send a UL grant without data in that subframe, which leads to inefficient usage of the unlicensed channel. The 4 ms delay between UL grant transmission and UL transmission also makes it difficult to have a short DL burst immediately followed by a UL burst.

The drawbacks of the legacy UL grant transmission reduce the potential of UL LAA significantly but can be addressed with simple improvements, such as scheduling multiple UL subframes from a single DL subframe, and reducing the minimum delay between the UL grant reception and the UL subframe. These will now be addressed in turn.

Multi-subframe scheduling. Scheduling multiple UL subframes from a single DL subframe reduces the signalling overhead for UL LAA and the interference caused to neighboring cells. For a low load situation with only UL traffic at a given time, if it is possible to schedule 4 UL subframes from within a DL subframe, the overhead of the grant transmission is reduced to 25%. The reduction in overhead could be somewhat smaller, if it is possible to indicate different configurations in the individual sub-frames. We might want to change Modulation and Coding Scheme (MCS), interlaces, Sounding Reference Signal (SRS) configurations, DMRS configurations, and so on. This feature is already supported in Time Division Duplexing (TDD), since configuration 0 with 3 UL subframes for 2 DL subframes supports scheduling multiple UL subframes from a single DL subframe. If the number of scheduled UL subframes with a DL subframe is further increased, e.g. to 12, the signalling overhead can be further reduced, e.g. to 8.33%, and the LAA UL performance further improved. However, the optimal number of scheduled UL subframes with the same DL subframe depends on many factors, such as traffic type, traffic load and UE buffer size. Therefore, the eNB should ideally have the freedom to configure how many UL subframes are scheduled with the same DL subframe. The MAC protocol impact is minimal, as discussed below. Thus, another proposal of the present disclosure is to support multi-subframe scheduling for UL.

Reduced UL grant delay. To further improve the uplink performance, the legacy fixed UL grant delay of 4 ms should be reduced. Considering a low-load situation with only UL traffic at a given time, if UL grant multiplexing alone is applied without further optimization, one can end up with the situation depicted in FIG. 5B.

Figure 5B:
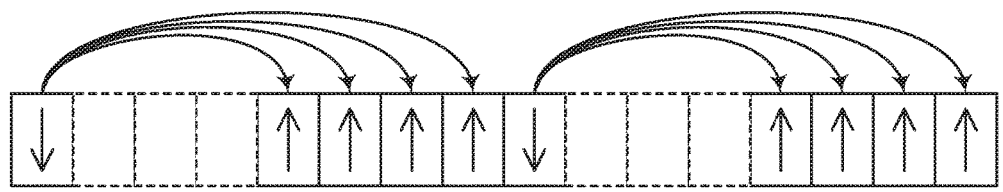
FIG. 5B depicts an example of UL grant multiplexing according to some embodiments of the present disclosure.

FIG. 5B depicts an example of UL grant multiplexing according to an embodiment of the present disclosure. The signalling overhead of the UL grant transmission is reduced, but instead of using previous UL grant subframes for UL data transmission, they are simply kept empty until UL transmissions commence. Thus, the uplink throughput remains limited.

The eNB scheduling may be optimized so as to avoid as far as possible the situation depicted in FIG. 5B. Nevertheless, this situation will occur each time the multiplexed UL grants transmission cannot occur in the planned subframe due to LBT failure. The most natural and straight-forward method to solve the issue in FIG. 5B is to reduce the grant delay for the uplink. Thus, another proposal of the present disclosure is to reduce the delay between the UL grant and the corresponding UL transmission to less than 4 ms.

Uplink HARQ for PUSCH

Proposal 1: Adopt Asynchronous UL HARQ

In section 7.2.2.2 of the LAA study item phase 3GPP Technical Report (TR) 36.889 V13.0.0, "[a]synchronous HARQ is recommended for LAA UL," specifically for the PUSCH. That means UL retransmissions may not only occur one Round Trip Time (RTT) (e.g., n+8) after the initial transmission but rather at any point in time. This is considered beneficial in particular when (re-) transmissions are blocked and postponed due to LBT. Thus, in order to maintain alignment with 3GPP Rel-14 functionality, the present disclosure proposes to adopt asynchronous UL HARQ (as agreed in Rel-13 Study Item (SI) for LAA UL).

Proposal 2: Non-Adaptive Uplink HARQ is not Supported

It was also agreed in section 7.2.2.2 of 3GPP TR 36.889 V13.0.0 that "with the UL asynchronous HARQ protocol, all transmission or retransmission should be scheduled via [Physical Downlink Control Channel (PDCCH)] or [Enhanced PDCCH (ePDCCH)]." In other words, non-adaptive HARQ is no longer supported as it would not fit well to the concept of asynchronous HARQ and it would require a reliable channel for carrying the ACK/NACK in DL. As used herein, the term "non-adaptive HARQ" refers to the mode of operation wherein a NACK on Physical HARQ Indicator Channel (PHICH) triggers HARQ retransmission one RTT after initial transmission on same frequency resource with the same MCS. PHICH could not be used as is: If the ACK on PHICH is blocked by LBT, the UE would perform a non-adaptive retransmission according to existing HARQ pattern and scheduling allocation. Thus, the present disclosure proposes that non-adaptive UL HARQ not be supported.

Proposal 3: Assume that UL HARQ was Successful, Set Status to ACK

When introducing asynchronous HARQ, the UE should therefore assume that all transmitted UL HARQ processes were successful (set local status to ACK). The UE performs a HARQ retransmission for a HARQ process only upon reception of a corresponding UL grant (New Data Indicator (NDI) not toggled) from the eNB. The process index is indicated in the HARQ process index field in the UL grant. Note that this is also efficient considering that most transmission attempts are successful anyway and hence no feedback (PHICH) is needed anymore. Thus, the present disclosure proposes that upon transmission of a UL HARQ process the UE assumes that it was transmitted successfully and sets the locally maintained status to ACK. The UE performs a HARQ retransmission for a UL HARQ process only upon reception of a corresponding UL Grant.

3GPP TR 36.889 V13.0.0 also mentions the need to introduce new means to flush a UL HARQ buffer. So far this happened with a counter per HARQ process (CURRENT_TX_NB) which the UE incremented once per RTT, i.e., whenever the process had a chance to be retransmitted. With the introduction of asynchronous HARQ the retransmissions may happen at other points in time. It was therefore discussed in 3GPP that it may be more appropriate to use a timer/counter that determines the number of subframes since the initial transmission of a process and flushes the process when the timer/counter exceeds a configured threshold. But whether or not it is necessary to flush the HARQ process depends, e.g., on how the Discontinuous Reception (DRX) is handled.

The 3GPP study also identified the need to redefine the DRX Active Time: The UE needs to determine in which subframes it shall monitor PDCCH in order to receive potentially incoming UL grants for HARQ retransmissions. Since retransmissions for a particular HARQ process are no longer bound to specific subframes, grants for UL retransmissions may, in principle, appear in any subframe for any process that has not yet been flushed. Therefore, a simple solution would be to change the condition in 3GPP TS 36.321, V 12.7.0 from "an uplink grant for a pending HARQ retransmission can occur and there is data in the corresponding HARQ buffer" to "there is data in any of the uplink HARQ buffers" and to flush the buffers as outlined in the previous paragraph. However, this approach would keep the UE awake continuously for a fairly long time after each UL transmission even if no retransmissions are required.

Proposal 4: The UE Starts an "Uplink HARQ Feedback Timer" in a Subframe where it has a Valid UL Grant Due to the introduction of asynchronous HARQ it is fortunately no longer necessary to keep the UE awake continuously. The eNB is allowed to schedule a retransmission for any UL HARQ process in any subframe (provided that LBT succeeded). It is therefore suggested that a principle be used similar to the HARQ RTT Timer and a DRX-RetransmissionTimer that have been used for DL HARQ since Rel-8. The difference is that a timer, referred to herein as a "UL HARQ Feedback Timer," starts in the subframe when the UL grant becomes valid—both if the transmission takes place as well as if it was blocked by unsuccessful LBT. The UL HARQ Feedback Timer runs until the earliest point in time when a UL grant for a retransmission may be received. Thus, the present disclosure proposes that the UE starts a UL HARQ Feedback Timer in a subframe where it has a valid UL grant, i.e., if either the UL transmission happens as well as if it is blocked by LBT.

Proposal 5: The UL HARQ Feedback Timer Triggers a DRX-Retransmission Timer

The present disclosure proposes that upon expiry of the UL HARQ Feedback Timer, the UE starts a corresponding DRX-Retransmission Timer and remains in Active Time as long as said DRX-Retransmission Timer is running.

Proposal 6: Flushing the HARQ Buffer Stops the UL HARQ Feedback Timer

The present disclosure further proposes that the UE stops the UL HARQ Feedback Timer upon flushing the corresponding HARQ buffer.

Proposal 7: One UL HARQ RTT Timer and One DRX-Retransmission Timer Per UL HARQ Process The present disclosure also proposes that one UL HARQ RTT Timer and one DRX-Retransmission Timer are associated with each UL HARQ process.

However, it is noted that if proposals 4-7 are agreeable, there is no strong need to flush UL HARQ buffers; thus, the present disclosure does not propose introducing such means for the time being. Alternatively, the present disclosure proposes that, where proposals 4-7 are adopted, flushing of UL HARQ buffers need not be done.

In the scope of the LAA study item, it has also been discussed to support multi-subframe scheduling so that the eNB could send UL grants for several PUSCH transmissions in a single DL subframe. This enhancement is considered useful as it maximizes resource utilization and throughput whenever the traffic is UL heavy. Currently, the interactions between L1 and MAC are modelled in a way that L1 takes care of the timing of grants and assignments. If a DCI comprises two UL grants (e.g., for TDD), L1 provides them in the two appropriate subframes to MAC. Assuming that the same modelling is applied, the multi-subframe UL scheduling is not expected to have any additional impact on the MAC specification. Note that the UL HARQ Feedback Timer suggested in proposals 4-7 ensures that the UE wakes at the earliest time when a retransmission for any of those UL processes may occur.

UL Feedback for DL HARQ

The DL HARQ protocol is already asynchronous since 3GPP Rel-8 and hence ready for use by LAA where the HARQ feedback (ACK/NACK) can be sent reliably on the PUCCH of a licensed PCell. However, for standalone operation (e.g., for a standalone LAA cell) (as well as for LAA with dual connectivity) the Uplink Control Information (UCI) is transmitted on unlicensed spectrum. As of today, regulatory rules allow to omit LBT for control information (not for user plane data) if those transmissions do not occupy the medium for more than 5% of the time. While it would be attractive from a protocol point of view to design the PUCCH based on this rule, the resulting collisions could impact the system performance negatively. Furthermore, it is not unlikely that there are attempts to modify or disallow this 5% rule. Therefore, it is proposed to investigate applying LBT to control signalling such as UCI.

Proposal 8: The UCI Identifies the DL HARQ Process(es)

As of today, the LTE DL HARQ design relies solely on the fixed timing relation between the DL HARQ process and the corresponding HARQ feedback. Due to LBT, the time between DL transmission and HARQ feedback will vary and it is therefore considered necessary to include the HARQ process ID in the HARQ feedback sent in the UL.

Since any kind of bundling increases the RTT, immediate feedback (in subframe n+4) is generally preferable. However, it also requires the eNB and the UE to switch the transmission direction (DL to UL, UL to DL) more frequently which increases the overhead. If the HARQ process ID needs to be included in the HARQ feedback anyway, it is easily possible to bundle HARQ feedback for multiple DL processes into a single UL message. The HARQ feedback and the corresponding process IDs could either be listed explicitly or be provided as a bitmap (one bit per process or per transport block). Thus, the present disclosure proposes that the UCI contains the DL HARQ process identifiers either explicitly or as a bitmap.

Proposal 9: The eNB Controls Whether and how Many HARQ Feedbacks the UE Bundles in a UCI While immediate feedback per process reduces the latency observed on the Internet Protocol (IP) layer, the feedback bundling improves the spectral efficiency. Which of these "modes" is preferable depends, e.g., on the system load and on the queue of the particular UE. Therefore, the eNB should have means to switch between the modes, i.e., request HARQ feedback frequently or let the UE bundle feedback for multiple processes.

Proposal 10: Each UL Serving Cell Carries the HARQ Feedback for the Corresponding DL Serving Cell As discussed in the section above titled "Realization of PUCCH on the Physical Layer," it is suggested that each UL serving cell carries the HARQ feedback for the corresponding DL serving cell. This is different from LTE where typically the PUCCH of the PCell carries the UCI for all SCells, but in terms of channel utilization and PUCCH format design it is suggested to keep it separate in LTE unlicensed standalone.

This request could be either explicit as part of the DL assignment or the UE could determine it based on the availability of appropriate resources for sending UCI. The details may vary and may also depend on the PUCCH design(s), which are discussed below.

The provisioning of ACK/NACK feedback for downlink HARQ processes is focused on here, but beyond that also Dedicated Scheduling Request (D-SR) and/or CSI needs to be transmitted.

Proposal 11: A UE with Valid UL Grant Multiplexes Pending HARQ (and Possibly Other UCI) onto PUSCH In principle, it should be possible to transmit HARQ feedback (UCI) in the same subframe as PUSCH from the same UE, the same subframe as PUSCH from another UE, the same subframe as Physical Downlink Shared Channel (PDSCH) for the same UE, the same subframe as PDSCH for another UE, or an empty subframe (UE did not receive UL grant nor detect PDSCH).

If a UE has a valid PUSCH grant, it is desirable to map the UCI information (if any is available) onto those PUSCH resources rather than using additional resource elements. As in LTE, this mapping to PUSCH offers preferable transmission characteristics compared to assigning additional resource elements for a PUCCH, such as a better cubic metric.

Figure 6:
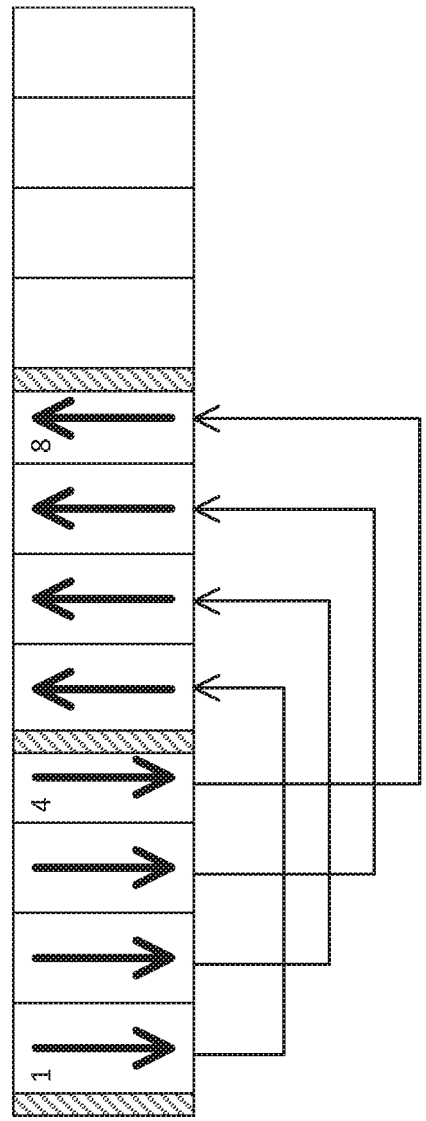
FIG. 6 depicts an example of Uplink Control Information (UCI) in a Physical Uplink Shared Channel (PUSCH) where the User Equipment device (UE) has received DL data (on the Physical Downlink Shared Channel (PDSCH)) in four consecutive subframes as well as UL grants valid for the four subsequent subframes according to some embodiments of the present disclosure.

FIG. 6 depicts an example of UCI in PUSCH where the UE has received DL data (PDSCH) in four consecutive subframes as well as UL grants valid for the four subsequent subframes according to an embodiment of the subject matter described herein. While it would be possible to bundle the HARQ feedback (e.g., into the last PUSCH subframe) it is preferable to send the HARQ feedback as early as possible. And since the UE has UL resources assigned anyway, the mapping shown below appears preferable. Thus, the present disclosure proposes that a UE with a valid UL grant may multiplex pending HARQ and possibly other UCI onto a PUSCH.

Figure 7:
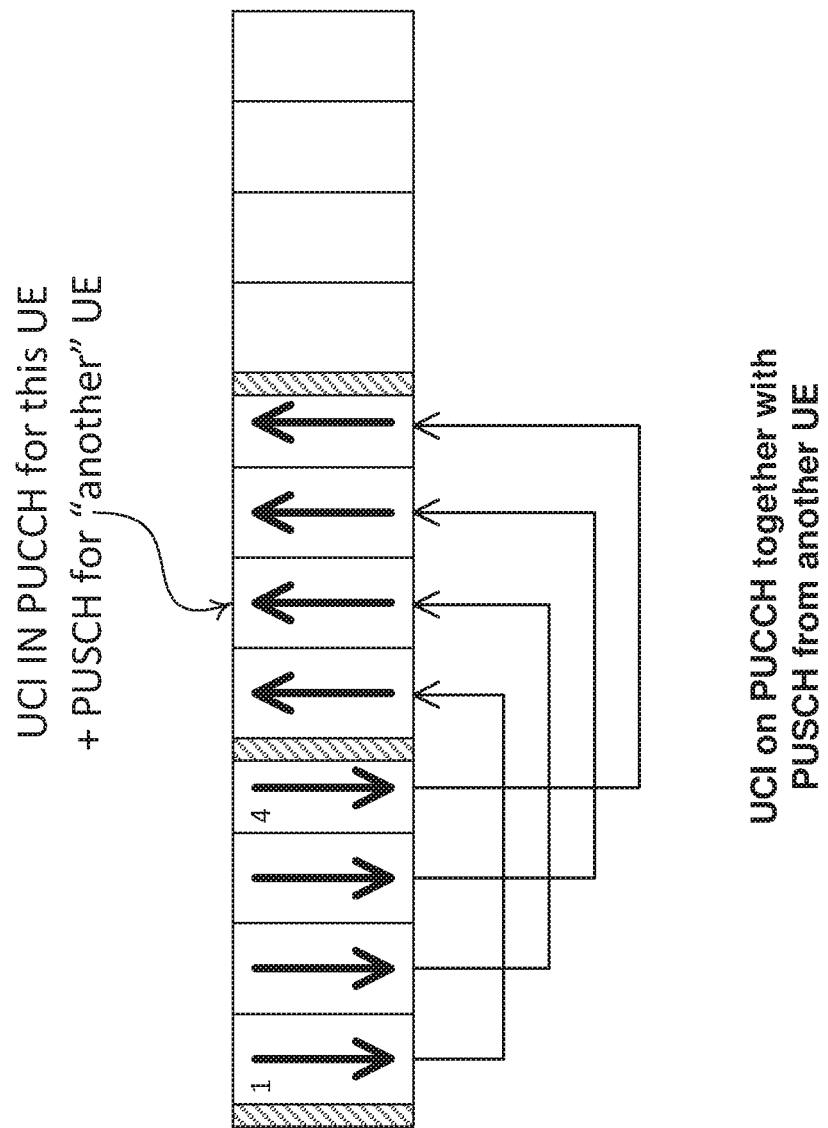
FIG. 7 depicts a similar case to that of FIG. 6 but here the UCI from the UE having received PDSCH in the first four subframes is mapped to a long PUCCH that spans across all available symbols of the subsequent four subframes whereas the PUSCH resources are assumed to be allocated to another UE.

Proposal 12: A UE without Valid UL Grant Sends Pending HARQ Feedback on (Long) PUCCH Upon Successful Short LBT FIG. 7 depicts an example of UCI in PUSCH according to another embodiment of the subject matter described herein. FIG. 7 depicts a case similar to the one in FIG. 6, but in the embodiment illustrated in FIG. 7, the UCI from the UE having received PDSCH in the first four subframes is mapped to a (long) PUCCH that spans across all available symbols of the subsequent four subframes whereas the PUSCH resources are assumed to be allocated to another UE.

While the PUSCH transmission resources are granted explicitly, it is assumed that the UE derives the PUCCH resources implicitly from the DL grants by similar mappings as defined in LTE. Before performing the PUCCH transmission, the UE has to perform LBT. As discussed for PUSCH in the Rel-13 study item, it is considered possible to perform just a short LBT since the preceding PDSCH transmission was subject to a regular LBT. In other words, the PUCCH uses the same LBT parameters as the scheduled PUSCH which allows multiplexing the transmissions in a single subframe.

In the example in FIG. 7, the UE has to shorten the fourth PUCCH transmission so that the eNB could perform DL LBT prior to a subsequent DL subframe. This implies that upon scheduling UL resources for subframe 8, the eNB also needs to decide whether the subsequent subframe 9 is going to be a UL or a DL subframe. If a DL subframe is supposed to follow, the preceding UL subframe needs to end earlier. While this constraint is considered to be undesirable, it follows the baseline established in Rel-13. The eNB could use the PDCCH broadcast signalling that was introduced in LAA Rel-13 to indicate shortening of the subframe. Alternatively, it could provide this information as part of the DL assignment.

Proposal 13: Skipping UL LBT

Figure 8:
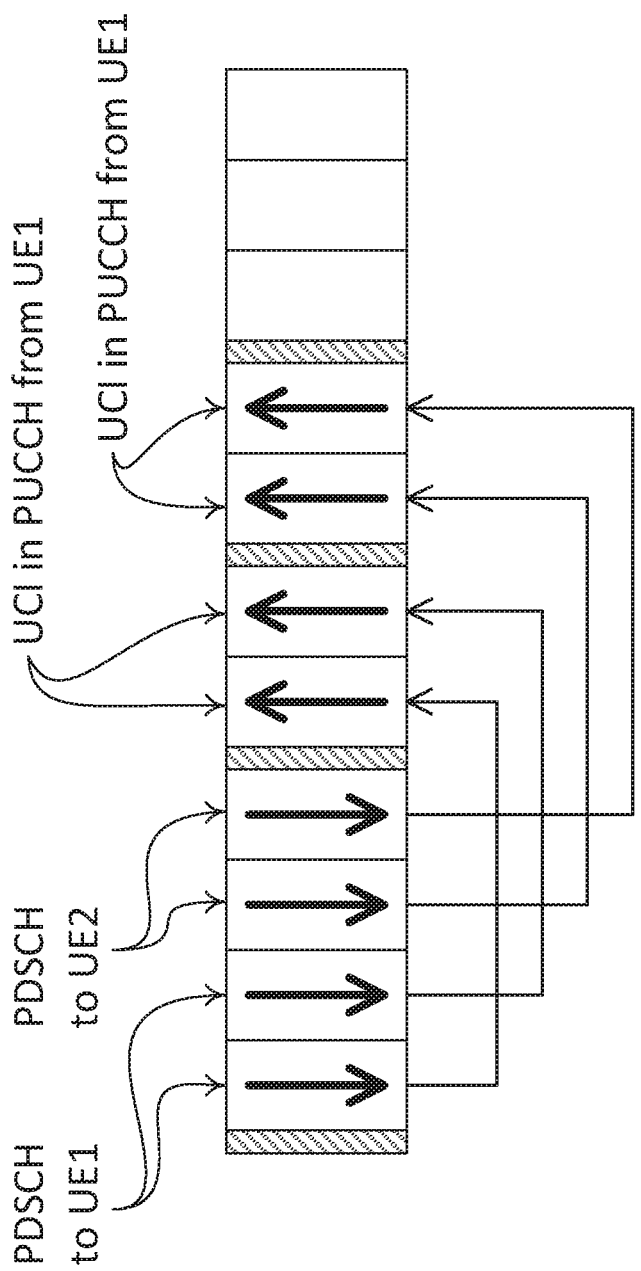
FIG. 8 illustrates an example of an embodiment in which additional LBT phases are needed if different UEs provide their PUCCH feedback in adjacent subframes.

FIG. 8 illustrates an example according to another embodiment of the subject matter described herein in which additional LBT phases are needed if different UEs provide their PUCCH feedback in adjacent subframes. In addition to the LBT upon the DL-to-UL and UL-to-DL transitions, additional LBT phases are needed if different UEs provide their PUCCH feedback in adjacent subframes. This is highlighted in FIG. 8 where a first UE receives PDSCH in the first two subframes and a second UE receives PDSCH in the third and fourth subframes. While the eNB may perform the DL transmissions back-to-back, the second UE needs to sense the channel to be empty before performing its PUCCH transmission.

When comparing the examples in FIG. 7 and FIG. 8, it becomes apparent that a UE cannot determine by itself whether to perform LBT at the beginning of a UL subframe. Even if it did use the preceding subframe for a UL transmission, it may have to do another LBT prior to the subsequent subframe, depending whether or not other UEs need to perform LBT in that subframe. Therefore, it is suggested that the eNB indicates explicitly in UL grants (for PUSCH) and DL assignments (for PUCCH) whether the UE may skip LBT for the corresponding UL subframe. In order to avoid error cases, the UE should perform (short) LBT in a scheduled UL subframe if it had not performed a UL transmission in the preceding subframe. This mismatch could have occurred due to the UE's LBT in the preceding subframe, or due to missing a UL grant or DL assignment. Thus, the present disclosure proposes that a UE may skip its UL LBT if both conditions are fulfilled: 1) the UE had performed a UL transmission (PUCCH or PUSCH) in the preceding subframe; and 2) the eNB explicitly permitted skipping LBT in the UL grant or DL assignment.

It is also worth pointing out that, in the examples of FIG. 7 and FIG. 8, the UE does not (need to) know whether its PUCCH transmission coincides with a PUSCH transmission of another UE. In other words, the proposals 2 and 5, above, are equivalent from the viewpoint of the UE transmitting the PUCCH.

Proposal 14: The UE Performs UL LBT at the Beginning of the UL Subframe Rather than at the End of the Preceding Subframe In Rel-13 LAA, it was decided that the eNB performs DL LBT prior to the start of a DL subframe and that it shortens the last PDSCH subframe of a DL burst to make room for a subsequent LBT. Similarly, one could consider shortening the last UL transmission (PUSCH or PUCCH) of a UE. Then, a UE should also perform UL LBT prior to its UL subframe. However, this approach has significant drawbacks: it requires that the eNB does not only decide whether the subsequent subframe will also be a UL subframe (see discussion above), but also whether it will be allocated to the same or another UE. If so, the current subframe can span the entire subframes; if not, the current subframe has to be shortened. Such "look-ahead" is processing heavy and increases the scheduling delay. Secondly, it would be desirable that the eNB has a chance to win LBT against one of its UEs that intend to transmit PUCCH. For these reasons the present disclosure proposes performing UL LBT at the beginning of a UL subframe rather than at the end of the preceding subframe.

Proposal 15: A UE Sends Pending HARQ Feedback (and Possibly Other UCI) on sPUCCH if the eNB Indicates a Shortened DL Subframe Earlier in this disclosure the concept of feedback bundling was introduced. In the example of FIG. 7, the UE provides its HARQ feedback as early as possible (i.e., n+4), which is desirable in terms of latency. If the subframes are used for PUSCH transmissions of other UEs anyway, the additional overhead due to immediate HARQ feedback is negligible. If, however, the eNB does not need the intermediate subframes, it would be desirable to leave those empty and to let the UE bundle the HARQ feedback within a single PUCCH transmission.

Figure 9:
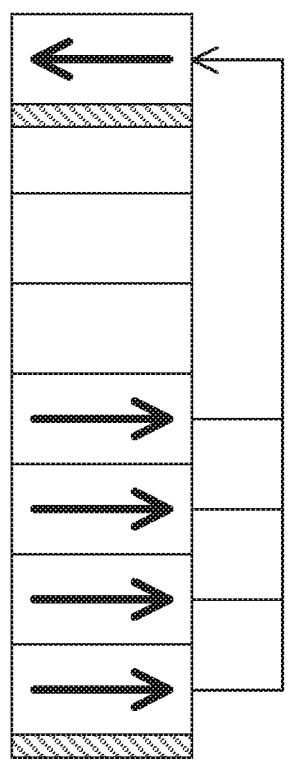
FIG. 9 illustrates a bundled PUCCH transmission according to some embodiments of the present disclosure.

FIG. 9 illustrates a bundled PUCCH transmission according an embodiment of the subject matter described herein. Since the bundling is considered to be a special case, it is suggested that the eNB instructs the UE in the DL assignment to postpone the HARQ feedback. In the example of FIG. 9, it provides this indication in the first three downlink subframes and hence the UE omits PUCCH in subframes 5, 6, and 7. At the beginning of subframe 8, it performs (short) LBT and sends the pending HARQ feedback for all four DL HARQ processes.

Today, the user traffic is DL heavy. Hence, there will be many occasions in which the eNB intends to schedule more DL than UL subframes. Spending entire subframes for PUCCH would create an undesirable overhead. It is therefore suggested to provide a short PUCCH in addition to the long PUCCH described here so far. This sPUCCH may appear at the end of a shortened DL subframe as shown in FIG. 10.

Figure 10:
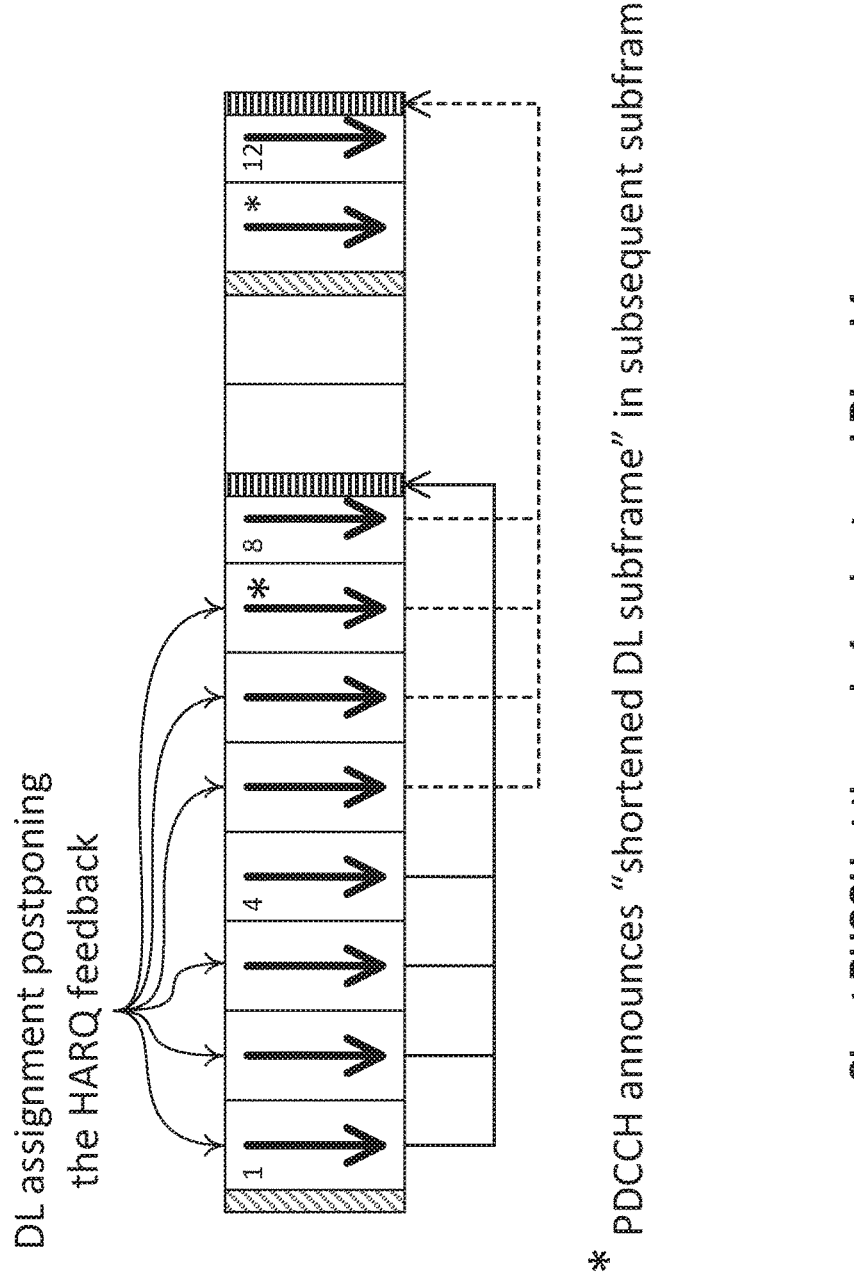
FIG. 10 illustrates one example in which a short PUCCH (sPUCCH) is located at the end of a shortened DL subframe.

FIG. 10 illustrates an example in which a sPUCCH is located at the end of a shortened DL subframe according to an embodiment of the subject matter herein. The subframes 1, 2, 3 and 5, 6, 7 instruct the UE to postpone its HARQ feedback. The assignments in subframes 4 and 8 don't have this indication and as a consequence the UE attempts to transmit UCI in subframe 8 (reflecting HARQ feedback for subframes 1-4) and in subframe 12 (reflecting HARQ feedback for subframes 5-8). If the UE would find those subframes to be empty or if it would receive a PUSCH grant for any of those subframes, it would provide the UCI feedback as described in the previous paragraphs. But in this example, the eNB decided to use these subframes primarily for DL data transfer. In subframes 7 and 11 it notifies all UEs via the PDCCH broadcast signalling that the subframes 8 and 12 will be shortened. The UE(s) with pending HARQ feedback will hence send that feedback on the sPUCCH.

Thus the present disclosure proposes that a UE may send pending HARQ feedback (and possibly other UCI) on an sPUCCH if the eNB indicates a shortened DL subframe.

Proposal 16: The UE does not Need to Perform LBT Prior to Transmission of sPUCCH Since the UCI is purely control signalling and since it follows directly after the eNB's DL transmission, the UE does not perform any LBT prior to the transmission. Of course, the eNB had to perform LBT at the beginning of that DL burst.

Proposal 17: The UE Determines the sPUCCH Resources Based on the Radio Resource Control (RRC) Configuration in Combination with the Received DL Assignment (Similar to PUCCH)

If the subframe following the sPUCCH is scheduled for PUSCH, those UEs will perform (short) LBT in the beginning of that UL subframe. If the eNB intends to continue with a PDSCH transmission after the sPUCCH it may do so after a short gap. This should occur in the end of the sPUCCH. As mentioned above, the eNB will thereby get the channel back and may prevent its UEs from sending regular PUCCH in the subsequent subframe.

Similarly to PUCCH, the UE determines the sPUCCH resources based on the RRC configuration in combination with the received DL assignment.

D-SR

Proposal 18: The Network May Configure the UE with D-SR Resources Using RRC Signalling In LTE, the eNB typically configures a UE that is RRC connected with a D-SR resource on PUCCH. The periodicity (e.g., 10, 20, 40 subframes) as well as the actual time/frequency resource is configured semi-statically via RRC. Upon arrival of data (IP packets) from a higher layer into the UEs empty Packet Data Convergence Protocol (PDCP) queue, a Buffer Status Report (BSR) is triggered. If the UE does not have a valid UL grant for sending the BSR, it sends a D-SR at its next D-SR occasion using PUCCH. The same principle could also be applied for LTE unlicensed standalone. However, it may be assumed that the UE performs LBT prior to the transmission of the D-SR on PUCCH.

Figure 11:
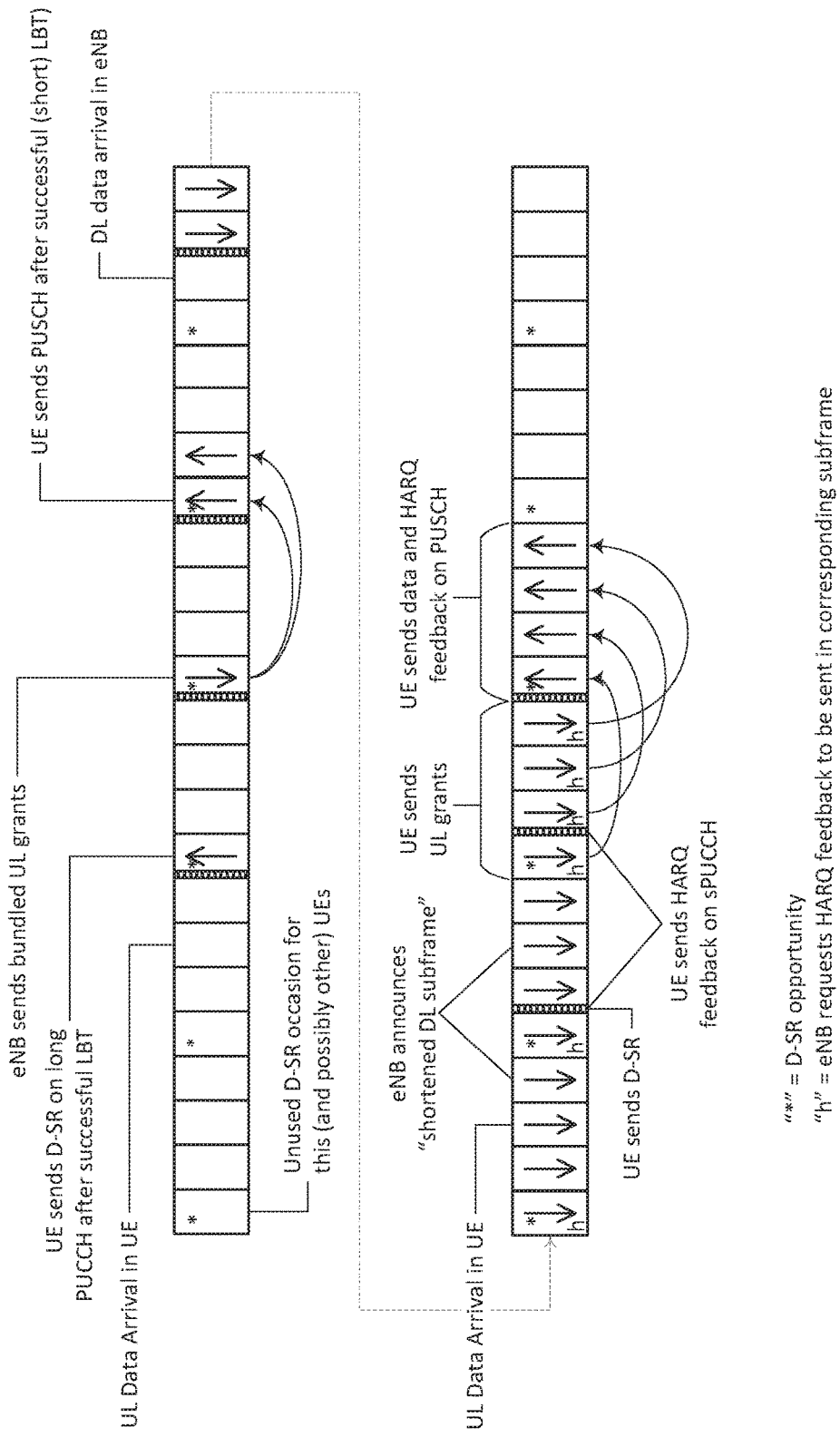
FIG. 11 depicts an example where a UE is configured with a Dedicated Scheduling Request (D-SR) opportunity in every fourth subframe.

Proposal 19: The UE May Send D-SR in Those Occasions on PUCCH after Successful LBT FIG. 11 depicts an example where a UE is configured with a D-SR opportunity in every fourth subframe according to an embodiment of the subject matter described herein. At times when none of the UEs connected with the eNB are actively transmitting or receiving data, the eNB minimizes DL transmissions (DRS only) and most subframes will be empty. In this example, the UE attempts to send a D-SR in the third depicted D-SR occurrence and succeeds in doing so after successful LBT in the beginning of the subframe.

Proposal 20: The UE May Send D-SR in Those Occasions on sPUCCH if the eNB Announces the Subframe to be a Shortened DL Subframe Once the channel is occupied by UL or DL data transmissions, the UE's LBT prior to D-SR is likely to fail due to ongoing PDSCH/PUSCH data bursts. However, what might appear as a problem at a first glance is actually a desirable property: By using a more aggressive LBT configuration (still fair to Wi-Fi) than its UEs, the eNB can grab the channel and schedule PDSCH/PUSCH efficiently as soon as data becomes available. To ensure that UEs can inform the eNB about available data, the eNB should declare at least some of the UEs' D-SR occasions as shortened DL subframes or leave them empty. As shown in the latter part of the sequence in FIG. 11, the UE will use those occasions for sending D-SR (and HARQ feedback).

While there is a need to multiplex HARQ feedback onto the UE's PUSCH resources, there is no need to do that with D-SR. The reason is that a UE having a valid UL grant will rather include a (more detailed) buffer status report inside the MAC Protocol Data Unit (PDU) sent on PUSCH.

CSI

Besides HARQ feedback and D-SR, PUCCH also carries the CSI. In LTE it can be mapped to PUCCH as well as to PUSCH.

Proposal 21: As Baseline, Only Aperiodic CSI Feedback is Supported. It is Mapped to PUSCH in Accordance with the UL Grant Provided by the eNB As discussed in the section above titled "Realization of PUCCH on the Physical Layer," the aperiodic CSI reporting is considered important. Like in LTE, the aperiodic CSI is mapped to PUSCH (with or without UL user data). It is therefore suggested to follow this principle for unlicensed standalone LTE.

Figure 12A:
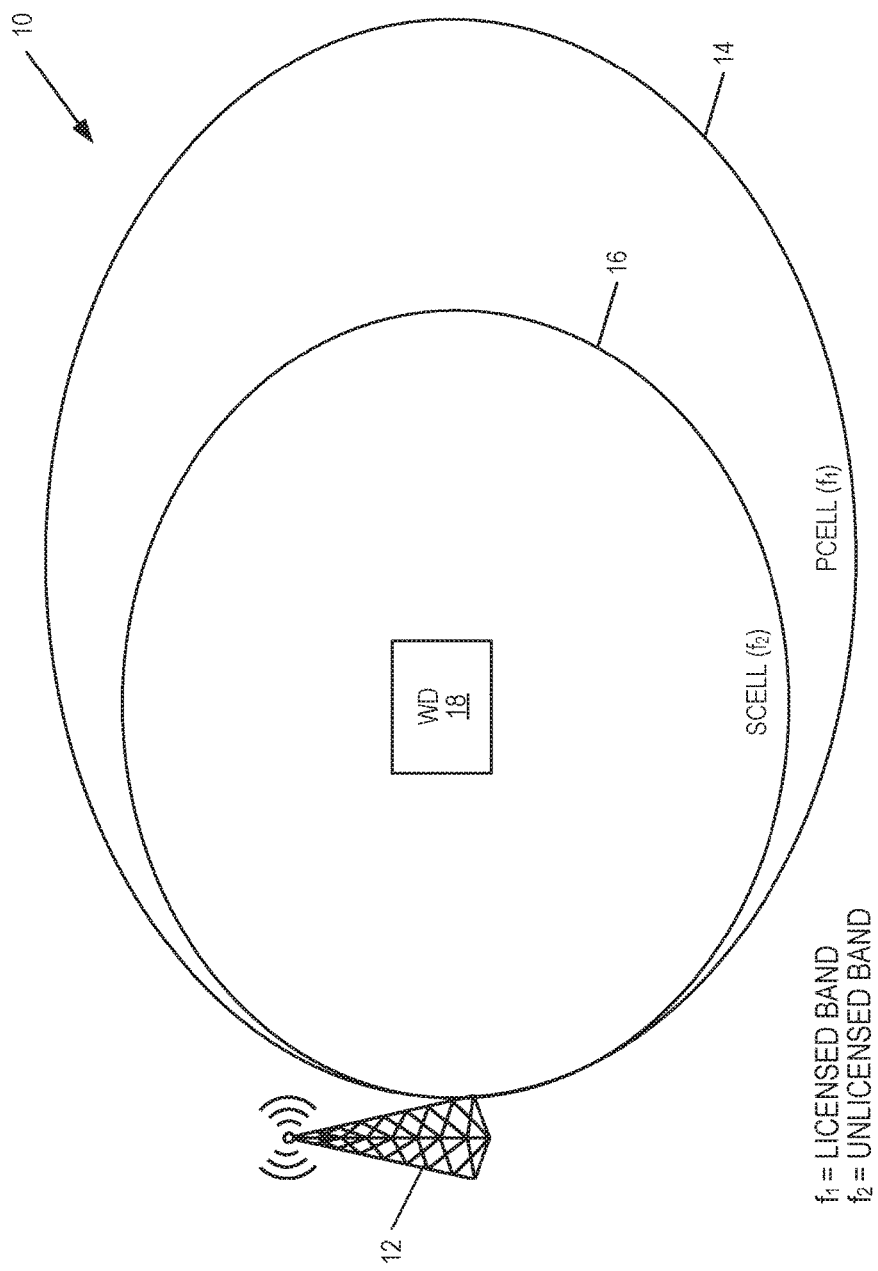
FIG. 12A and 12B illustrate examples of a cellular communications network in which embodiments of the present disclosure may be implemented.
Figure 12B:
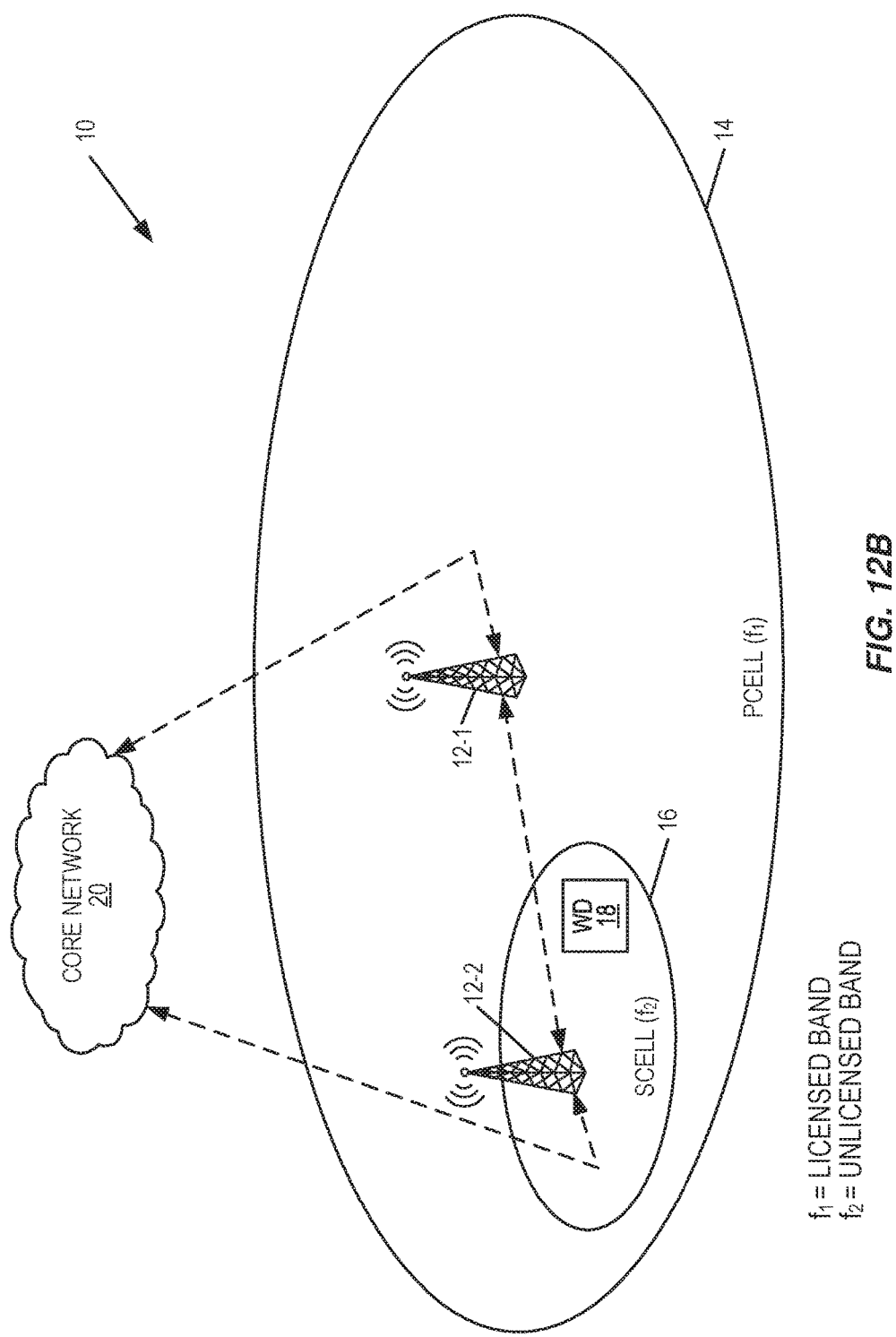

FIGS. 12A and 12B illustrate examples of a cellular communications network in which embodiments of the present disclosure may be implemented. The example embodiments illustrated in FIGS. 12A and 12B are implemented in a cellular communications network 10 (also referred to herein as a communications system). In the example of FIG. 12A, the cellular communications network 10 includes a base station 12 (e.g., an eNB in LTE terminology) serving a cell 14 operating on a carrier $f_1$ in a licensed frequency spectrum and a cell 16 operating on a carrier $f_2$ in an unlicensed frequency spectrum (e.g., the 5 gigahertz (GHz) frequency spectrum). According to one example LAA scheme, the cell 14 is configured as a PCell of a wireless device 18 (e.g., an LTE UE), and the cell 16 is configured as an SCell of the wireless device 18, according to a CA scheme for LAA. As such, with respect to the wireless device 18, the cell 14 is referred to as the PCell 14 of the wireless device 18, and the cell 16 is referred to as the SCell 16 or, more precisely, the LAA SCell 16 of the wireless device 18.

In FIG. 12B, the cells 14 and 16 are served by separate base stations 12-1 and 12-2, respectively. In this regard, the cell 16 may be a standalone LAA cell or an LAA cell utilized with respect to the wireless device 18 according to a dual connectivity scheme (where the base stations 12-1 and 12-2 are connected via a non-ideal backhaul link). The base stations 12-1 and 12-2 are communicatively connected to a core network 20 (e.g., an Evolved Packet Core (EPC)) and, in some embodiments, may communicate with one another either via a base-station-to-base-station interface (e.g., the X2 interface in LTE) or via the core network 20.

Figure 13:
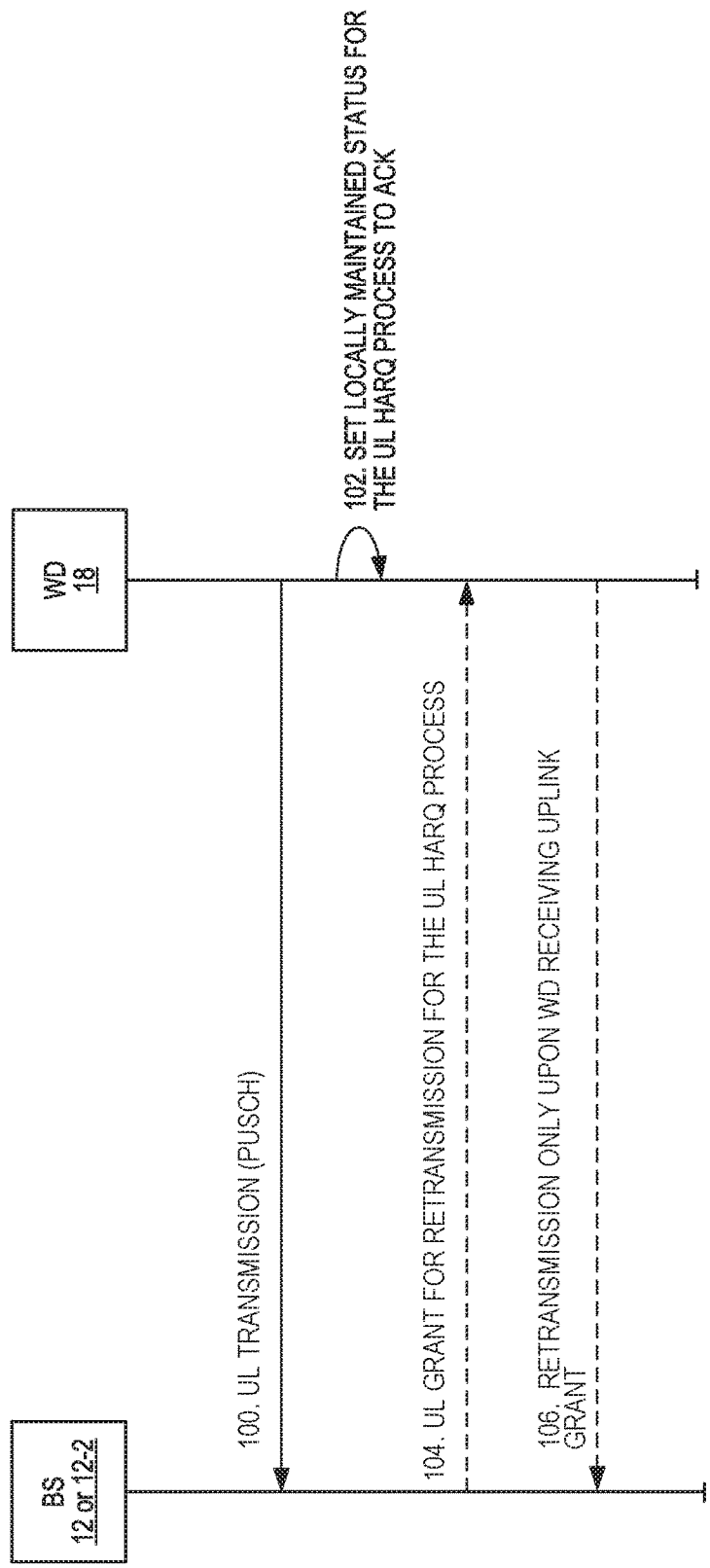
FIG. 13 illustrates the operation of a base station and a wireless device to implement proposal 3 according to some embodiments of the present disclosure.

FIG. 13 illustrates the operation of the base station 12-1 (or the base station 12-2) and the wireless device 18 to implement proposal 3 above according to some embodiments of the present disclosure. As illustrated, when utilizing asynchronous HARQ, the wireless device 18 transmits a UL transmission for a particular UL HARQ process on the LAA cell (step 100). The wireless device 18 assumes that the UL transmission was successful and, as such, sets a locally maintained status for the UL HARQ process to ACK (step 102). The wireless device 18 may or may not receive a subsequent UL grant (NDI not toggled) from the base station 12-1 (or 12-2) corresponding to the UL HARQ process (step 104). In some embodiments, the UL HARQ process index is indicated in the HARQ process index field in the UL grant. The wireless device 18 only performs HARQ retransmission for the HARQ process upon reception of a corresponding UL grant for the UL HARQ process (step 106).

Figure 14:
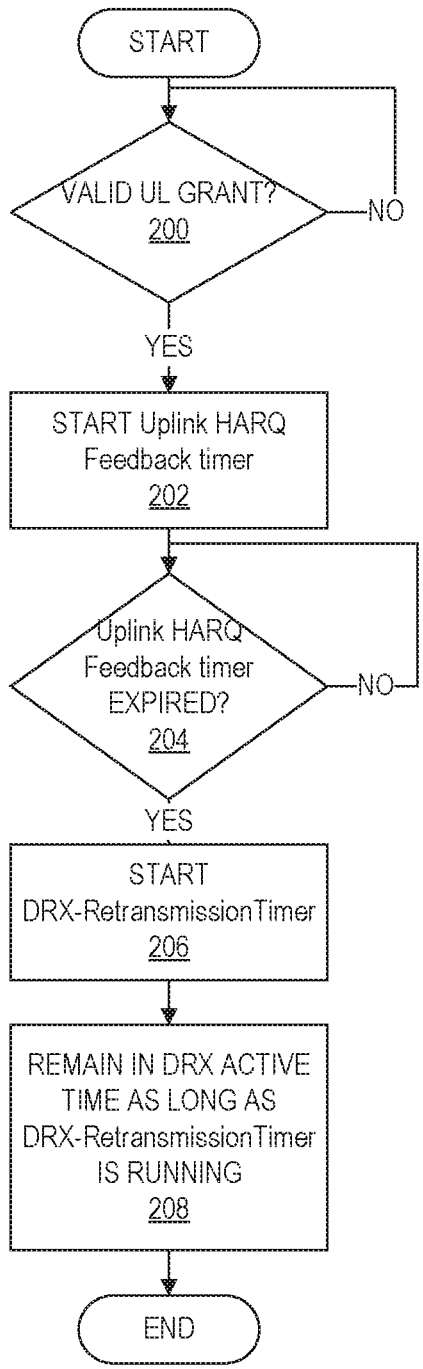
FIG. 14 is a flow chart that illustrates the operation of a wireless device to implement proposals 4-7 according to some embodiments of the present disclosure.

FIG. 14 is a flow chart that illustrates the operation of the wireless device 18 to implement proposals 4-7 above according to some embodiments of the present disclosure. As illustrated, the wireless device 18 determines whether the wireless device 18 has a valid UL grant on the LAA cell in a subframe (step 200). If not, the wireless device 18 continues to monitor for a valid UL grant on the LAA cell. If the wireless device 18 has a valid UL grant on the LAA cell in the subframe, the wireless device 18 starts a UL HARQ Feedback timer for a corresponding HARQ process (step 202). The wireless device 18 then monitors for expiry of the Uplink HARQ Feedback timer for the HARQ process (step 204). Once the UL HARQ Feedback timer has expired, in this example, the wireless device 18 starts a corresponding DRX-RetransmissionTimer and remains in the DRX Active Time as long as the DRX-RetransmissionTimer is running (steps 206 and 208). Note that while FIG. 14 utilizes both the UL HARQ Feedback timer and the DRX-Retransmission-Timer, the process may alternatively use only one of the two timers, e.g., the UL HARQ Feedback timer (in which case any desired action may be performed upon expiry of the UL HARQ Feedback timer where this action is not limited to starting the DRX-RetransmissionTimer).

Figure 15:
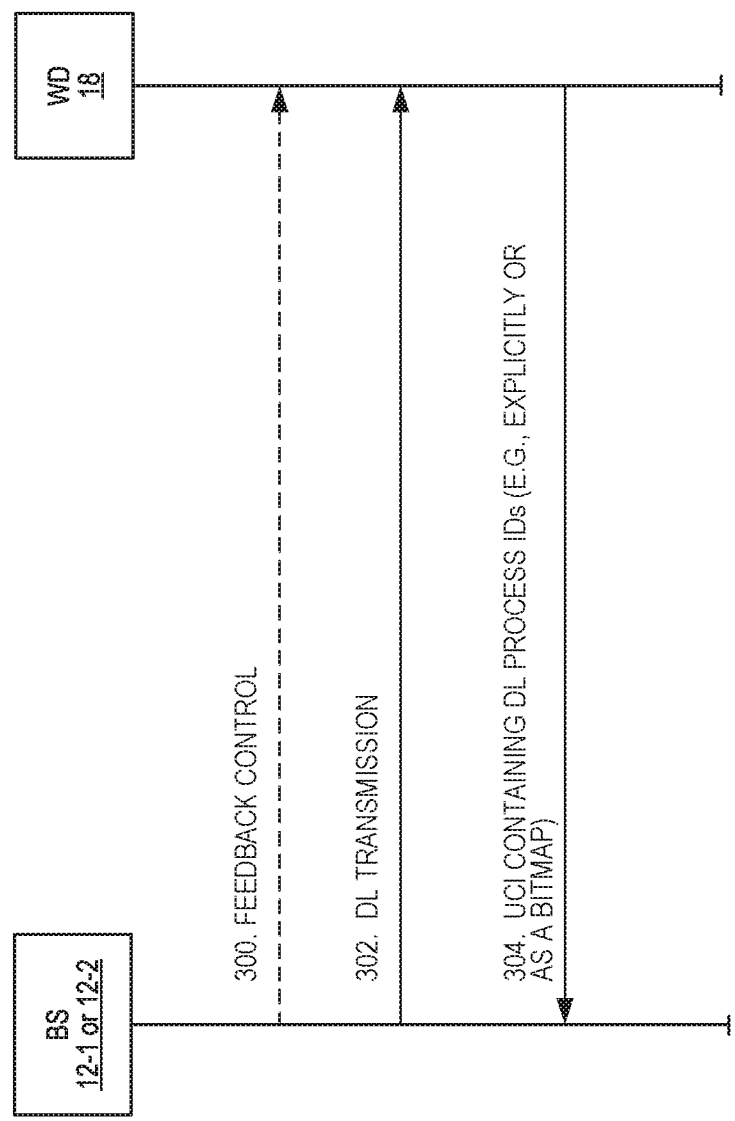
FIG. 15 illustrates the operation of a base station and a wireless device to implement proposal 8 or 9 according to some embodiments of the present disclosure.

FIG. 15 illustrates the operation of the base station 12-1 (or the base station 12-2) and the wireless device 18 to implement proposal 8 or 9 above according to some embodiments of the present disclosure. As illustrated, in some embodiments, the base station 12-1 (or the base station 12-2) sends feedback control information to the wireless device 18 to control whether HARQ feedback bundling is to be performed by the wireless device 18 for UCI (step 300). The feedback control information may also indicate how many HARQ feedbacks the wireless device 18 is to bundle in UCI. As indicated by the dashed line, step 300 is optional. The base station 12-1 (or the base station 12-2) transmits one or more DL transmissions to the wireless device 18 on the LAA cell for one or more DL HARQ processes (step 302). At some point, the wireless device 18 transmits UCI (including (bundled) HARQ feedback) containing the DL HARQ process IDs of the one or more DL HARQ processes, e.g., either explicitly or as a bitmap (step 304).

Figure 16:
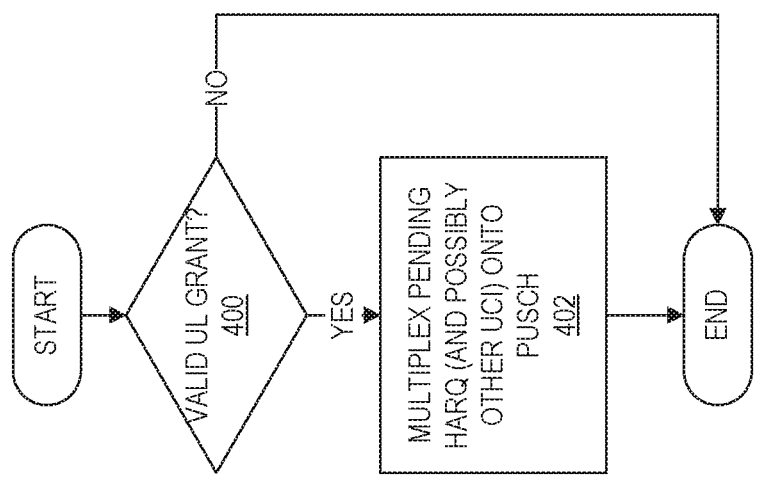
FIG. 16 is a flow chart that illustrates the operation of a wireless device to implement proposal 11 according to some embodiments of the present disclosure.

FIG. 16 is a flow chart that illustrates the operation of the wireless device 18 to implement proposal 11 above according to some embodiments of the present disclosure. As illustrated, the wireless device 18 determines whether the wireless device 18 has a valid UL grant on the LAA cell in a subframe (step 400). If not, in this example, the process ends. If the wireless device 18 has a valid UL grant on the LAA cell in the subframe, the wireless device 18 multiplexes pending HARQ feedback (and possibly other UCI) onto PUSCH (step 402).

Figure 17:
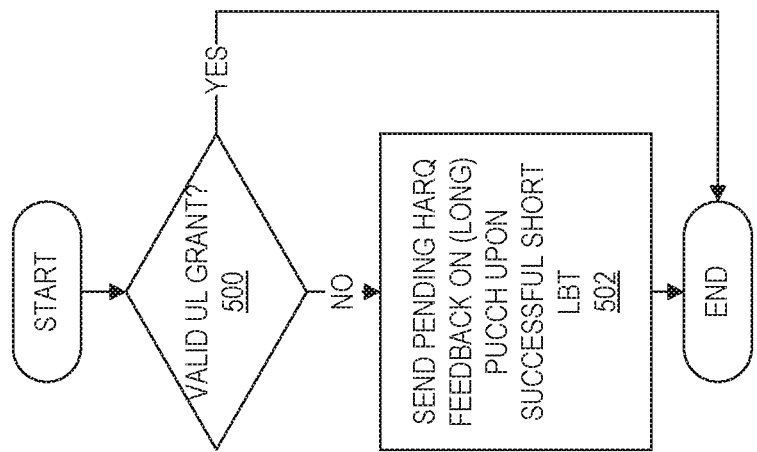
FIG. 17 is a flow chart that illustrates the operation of a wireless device to implement proposal 12 according to some embodiments of the present disclosure.

FIG. 17 is a flow chart that illustrates the operation of the wireless device 18 to implement proposal 12 above according to some embodiments of the present disclosure. As illustrated, the wireless device 18 determines whether the wireless device 18 has a valid UL grant on the LAA cell in a subframe (step 500). If so, in this example, the process ends. If the wireless device 18 does not have a valid UL grant on the LAA cell in the subframe, the wireless device 18 sends pending HARQ feedback on (long) PUCCH upon successful short LBT (step 502).

Note that the processes of FIGS. 16 and 17 may be utilized together such that, if there is a valid UL grant, the wireless device 18 multiplexes pending HARQ feedback (and possibly other UCI) onto PUSCH; but, if there is not a valid UL grant, the wireless device 18 sends pending HARQ feedback on (long) PUCCH upon successful short LBT.

FIG. 18 illustrates the operation of the base station 12-1 (or the base station 12-2) and the wireless device 18 to implement proposal 13 above according to some embodiments of the present disclosure. As illustrated, the base station 12-1 (or the base station 12-2) transmits a UL grant or a DL assignment for the LAA cell to the wireless device 18 (step 600). The wireless device 18 skips UL LBT for the LAA cell if both (1) the wireless device 18 performed a UL transmission (PUCCH or PUSCH) in the preceding subframe and (2) the base station 12-1 (or the base station 12-2) explicitly permitted skipping LBT for the LAA cell in the UL grant (for PUSCH) or DL assignment (for PUCCH) (step 602). Assuming both conditions are true, the wireless device 18 performs the UL transmission on the LAA cell, skipping LBT (step 604).

Figure 19:
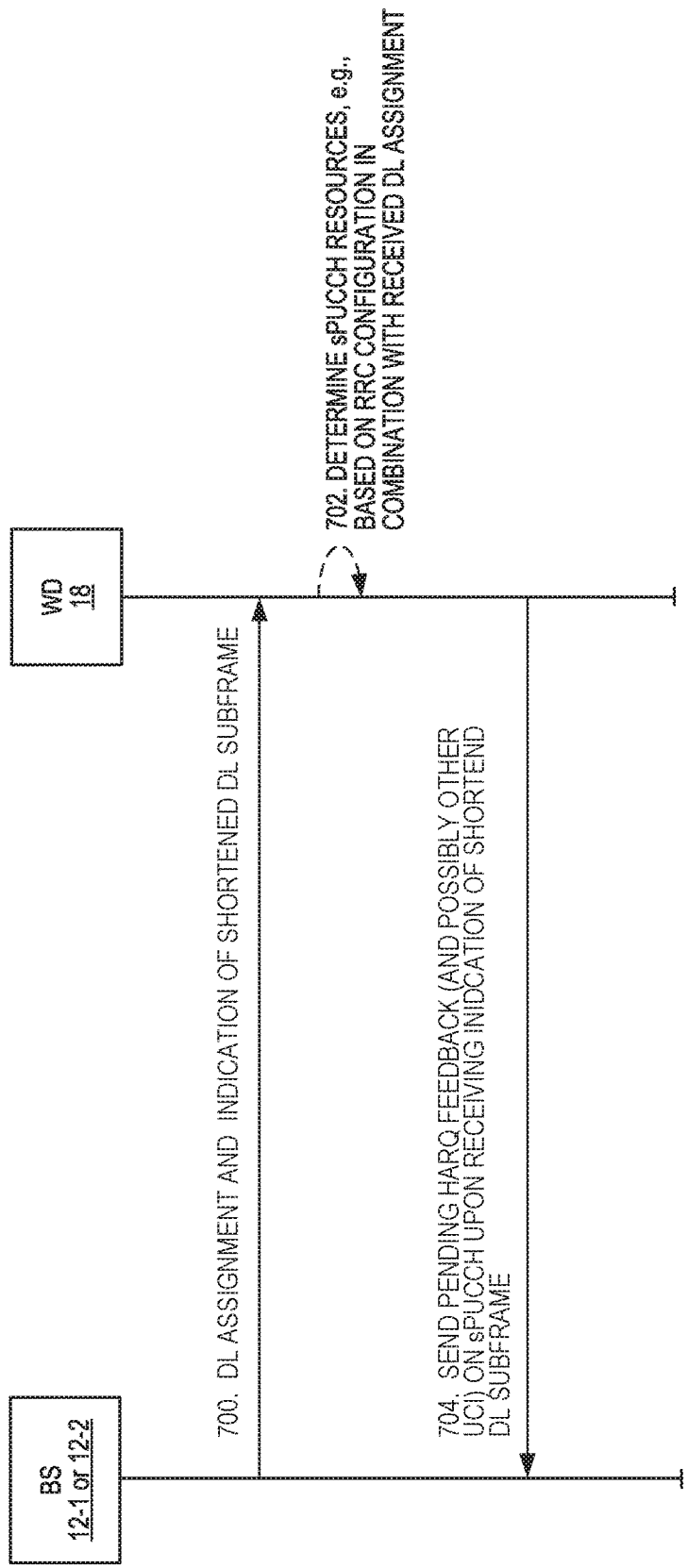
FIG. 19 illustrates the operation of a base station and a wireless device to implement some or all of proposals 15-17 according to some embodiments of the present disclosure.

FIG. 19 illustrates the operation of the base station 12-1 (or the base station 12-2) and the wireless device 18 to implement some or all of proposals 15-17 above according to some embodiments of the present disclosure. As illustrated, the base station 12-1 (or the base station 12-2) sends a DL assignment for a subframe on the LAA cell to the wireless device 18 and an indication that the subframe is a shortened DL subframe (step 700). Optionally (as indicated by the dashed arrow), the wireless device 18 determines sPUCCH resources to be utilized for HARQ feedback based on, e.g., RRC configuration in combination with the received DL assignment (step 702). The wireless device 18 sends pending HARQ feedback (and possibly other UCI) on sPUCCH (e.g., using the determined sPUCCH resources) upon receiving the indication of the shortened DL subframe (step 704).

Figure 20:
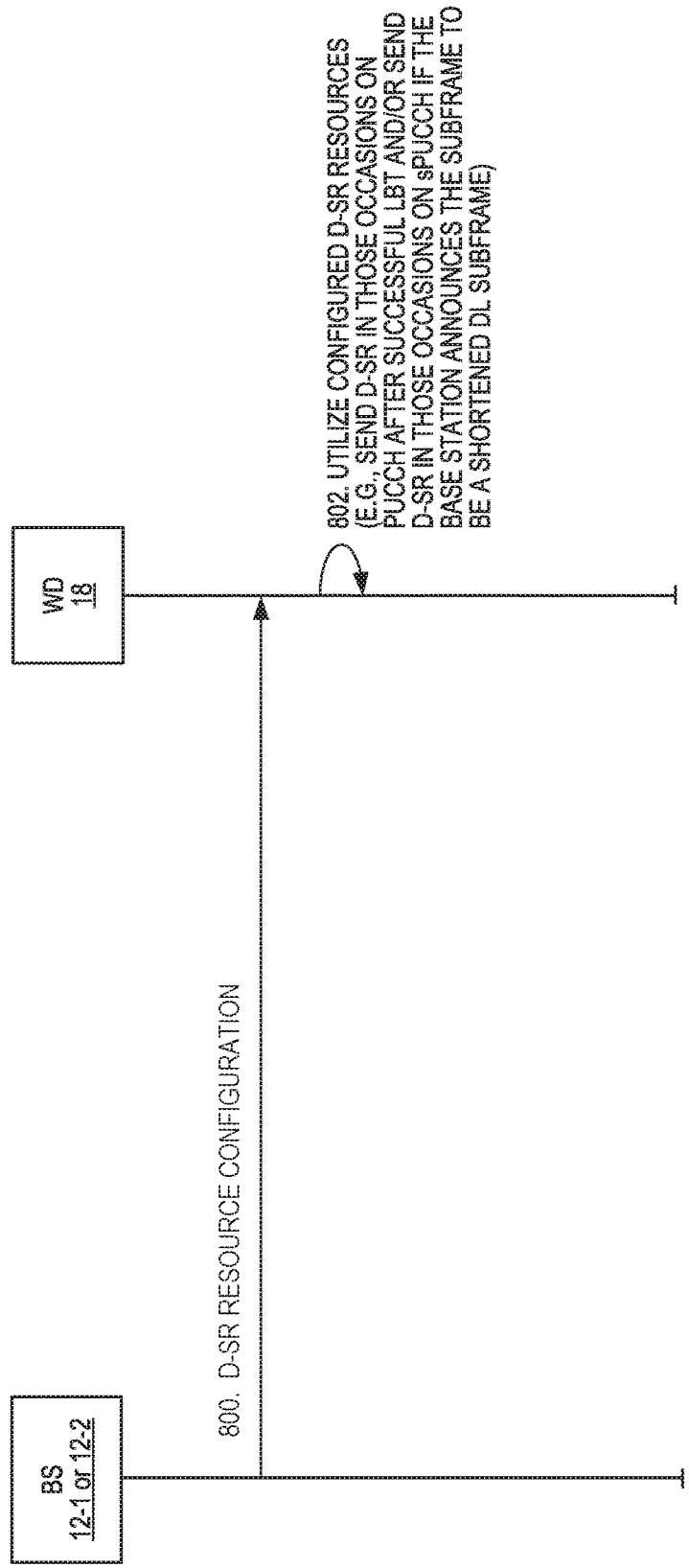
FIG. 20 illustrates the operation of a base station and a wireless device to implement some or all of proposals 18-20 according to some embodiments of the present disclosure.

FIG. 20 illustrates the operation of the base station 12-1 (or the base station 12-2) and the wireless device 18 to implement some or all of proposals 18-20 above according to some embodiments of the present disclosure. As illustrated, the base station 12-1 (or the base station 12-2) configures the wireless device 18 with D-SR resources using, e.g., RRC signalling (step 800). The wireless device 18 utilizes the configured D-SR resources (step 802). More specifically, the wireless device 18 may send D-SR in those occasions on PUCCH after successful LBT and/or may send D-SR in those occasions on sPUCCH if the base station 12-1 (or 12-2) announces the subframe to be a shortened DL subframe.

Figure 21:
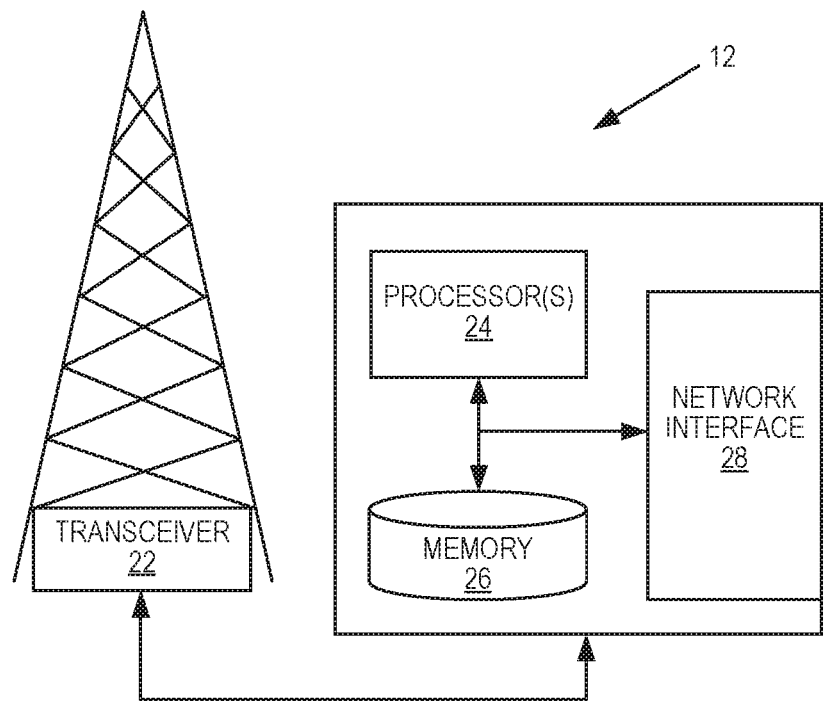
FIGS. 21 and 22 illustrate embodiments of a base station according to some embodiments of the present disclosure.

FIG. 21 is schematic diagram of the base station 12 in accordance with some embodiments of the present disclosure. Note that this discussion is equally applicable to the base stations 12-1 and 12-2. The base station 12 can be an LTE base station (e.g., an eNB, or a PCell base station) or another type of base station that can communicate wirelessly with the wireless device 18 (which, in LTE, may be a UE) (e.g., an SCell radio station operating in unlicensed spectrum). The base station 12 includes a transceiver 22, one or more processors 24 (e.g., one or more Central Processing Units (CPUs), one or more Application Specific Integrated Circuits (ASICs), one or more Field Programmable Gate Arrays (FPGAs), and/or the like), memory 26, and a network interface 28. The transceiver 22, which may include one or more transmitters and one or more receivers, allows the base station 12 to send and receive wireless signals. The processor(s) 24 can execute instructions stored in the memory 26 based on, e.g., signals received wirelessly via the transceiver 22. In particular, in some embodiments, the functionality of the base station 12 described herein is implemented in software that is stored in the memory 26 and executed by the processor(s) 24. The network interface 28 allows the base station 12 to interact with a core network, such as sending and receiving signals from a wired link. The base station 12 can communicate wirelessly with one or more wireless devices 18.

In some embodiments, a computer program including instructions which, when executed by at least one processor 24, causes the at least one processor 24 to carry out the functionality of the base station 12 (or the base station 12-1 or 12-2) according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 26).

Figure 22:
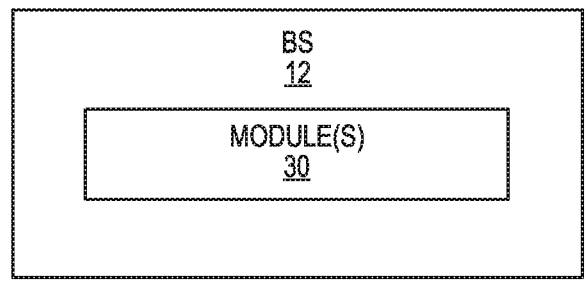

FIG. 22 illustrates the base station 12 according to some other embodiments of the present disclosure. Note that this discussion is equally applicable to the base stations 12-1 and 12-2. The base station 12 includes one or more modules 30, each of which is implemented in software. The module(s) 30 operate to provide the functionality of the base station 12 according to any of the embodiments described herein.

Figure 23:
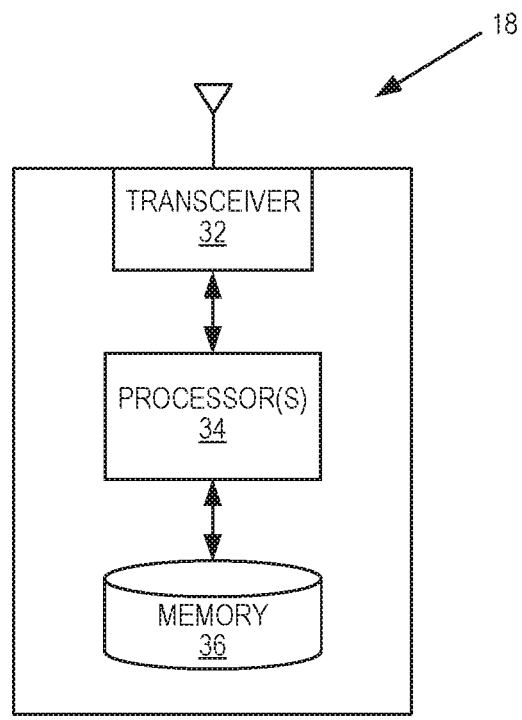
FIGS. 23 and 24 illustrate embodiments of a wireless device according to some embodiments of the present disclosure.

FIG. 23 is a schematic diagram of the wireless device 18 in accordance with some embodiments of the present disclosure. The wireless device 18 is configured to send and receive wireless signals using resources from the licensed spectrum (e.g., the licensed LTE spectrum in the example embodiments described herein), the unlicensed spectrum, or both. The wireless device 18 includes a transceiver 32 including one or more transmitters and one or more receivers, one or more processors 34 (e.g., one or more CPUs, one or more ASICs, one or more FPGAs, and/or the like), and memory 36. The transceiver 32 allows the wireless device 18 to send and receive wireless signals. The processor(s) 34 can execute instructions stored in the memory 36 based on, e.g., signals received wirelessly via the transceiver 32. In particular, in some embodiments, the functionality of the wireless device 18 described herein is implemented in software that is stored in the memory 36 and executed by the processor(s) 34.

In some embodiments, a computer program including instructions which, when executed by at least one processor 34, causes the at least one processor 34 to carry out the functionality of the wireless device 18 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 36).

Figure 24:
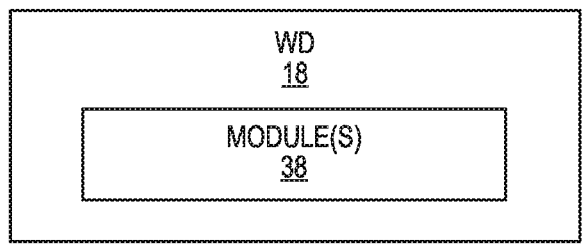

FIG. 24 illustrates the wireless device 18 according to some other embodiments of the present disclosure. The wireless device 18 includes one or more modules 38, each of which is implemented in software. The module(s) 38 operate to provide the functionality of the wireless device 18 according to any of the embodiments described herein.

Figure 25:
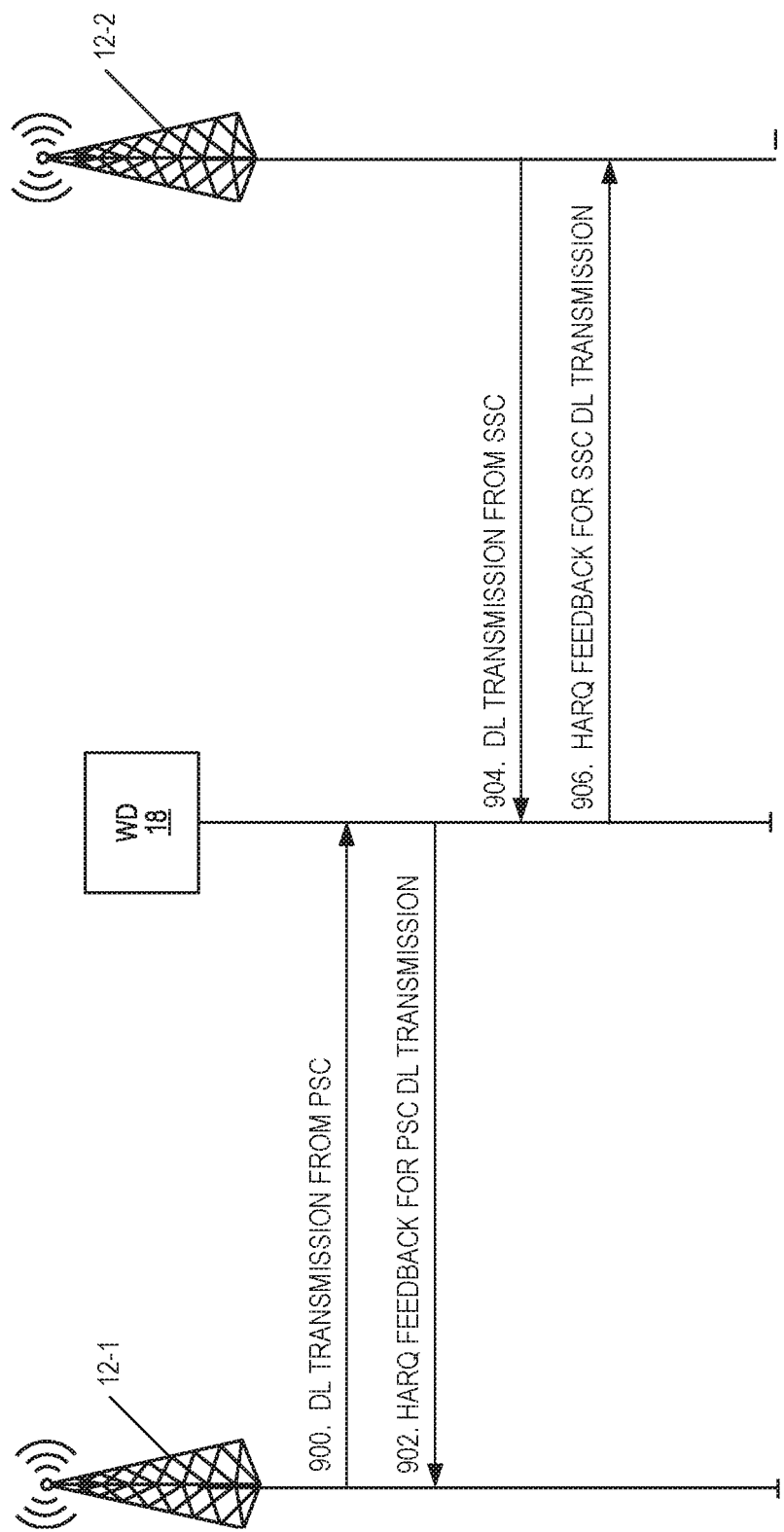
FIG. 25 illustrates the operation of a wireless device in a primary serving cell and in a secondary serving cell according to some embodiments of the present disclosure.

FIG. 25 illustrates the operation of a wireless device in a Primary Serving Cell (PSC) and in a Secondary Serving Cell (SSC) according to some embodiments of the present disclosure. In the embodiment illustrated in FIG. 25, a wireless device 18 that is operating in a network having a primary serving cell 12-1 and a SSC 12-2 receives a DL transmission from the PSC 12-1 (step 900). In response to receiving the DL transmission from the PSC, the wireless device 18 provides HARQ feedback to the PSC (step 902). The wireless device 18 receives a DL transmission from the SSC 12-2 (step 904) and responds by providing a HARQ feedback to the SSC instead of to the PSC (step 906).

Figure 26:
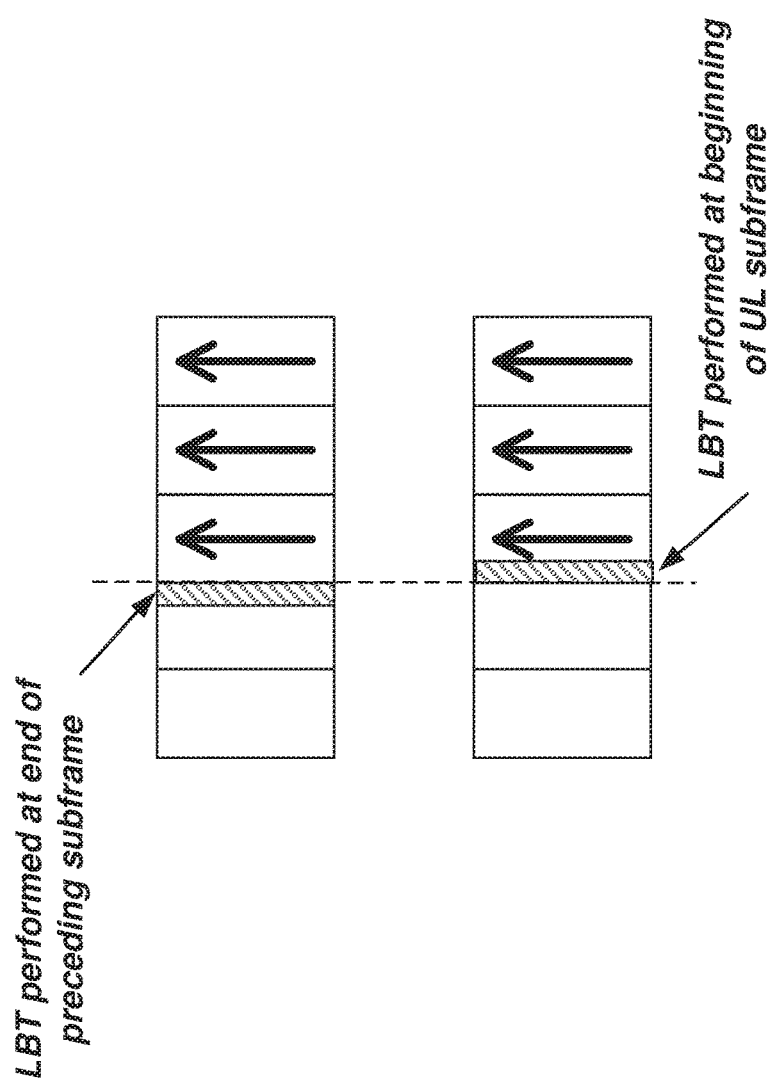
FIG. 26 illustrates an LBT operation being performed at the end of a subframe just prior to a UL subframe versus an LBT operation being performed at the beginning of a UL subframe according to some embodiments of the present disclosure.

FIG. 26 illustrates an LBT operation (shaded portion) being performed at the end of a subframe just prior to a UL subframe versus an LBT operation being performed at the beginning of a UL subframe according to some embodiments of the present disclosure.

The following acronyms may be used throughout this disclosure.

μs Microsecond
3GPP Third Generation Partnership Project
5G Fifth Generation
ACK Acknowledgement
AP Access Point
ASIC Application Specific Integrated Circuit
BSR Buffer Status Report CA Carrier Aggregation
CC Component Carrier
CCA Clear Channel Assessment
CCA-ED Clear Channel Assessment Energy Detection
CFI Control Format Indicator
CIF Carrier Indicator Field
CPU Central Processing Unit
CRC Cyclic Redundancy Check
CRS Cell Specific Reference Symbol
CSI Channel State Information
CSMA/CA Carrier Sense Multiple Access with Collision Avoidance
DCI Downlink Control Information
DFT Discrete Fourier Transform
DL Downlink
DMRS Demodulation Reference Signal
DRS Dedicated Reference Signal
DRX Discontinuous Reception
D-SR Dedicated Scheduling Request
eNB Enhanced or Evolved Node B
EPC Evolved Packet Core
EPDCCH Enhanced Physical Downlink Control Channel
FDMA Frequency Division Multiple Access
FPGA Field Programmable Gate Array
GHz Gigahertz
HARQ Hybrid Automatic Repeat Request
ID Identifier
IP Internet Protocol
LAA License Assisted Access
LBT Listen-Before-Talk
LTE Long Term Evolution
LTE-U Long Term Evolution in Unlicensed Spectrum
MAC Medium Access Control
MCS Modulation and Coding Scheme
MHz Megahertz
ms Millisecond
MTC Machine Type Communication
NACK Negative Acknowledgment
NDI New Data Indicator
OCC Orthogonal Cover Code
OFDM Orthogonal Frequency Division Multiplexing
PCell Primary Cell
PDCCH Physical Downlink Control Channel
PDCP Packet Data Convergence Protocol
PDSCH Physical Downlink Shared Channel
PDU Protocol Data Unit
PHICH Physical Hybrid Automatic Repeat Request Indicator Channel
PSC Primary Serving Cell
PUCCH Physical Uplink Control Channel
PUSCH Physical Uplink Shared Channel
RE
Rel-n Release n
RRC Radio Resource Control
RTT Round Trip Time
SCell Secondary Cell
SC-FDMA Single Carrier Frequency Division Multiple Access
SI Study Item
sPUCCH Short Physical Uplink Control Channel
SR Scheduling Request
SRS Sounding Reference Signal
SSC Second Serving Cell
TBCC Tail Biting Convolutional Code
TDD Time Division Duplexing
TR Technical Report
TTI Transmit Time Interval
UCI Uplink Control Information
UE User Equipment
UL Uplink
UL-SCH Uplink Shared Channel
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device, comprising:
determining whether the wireless device has a valid Uplink, UL, grant in a subframe on a cell, the cell operating in an unlicensed frequency spectrum;
starting a UL Hybrid Automatic Repeat Request, HARQ, feedback timer upon determining that the wireless device has a valid UL grant in the subframe on the cell; and
starting a Discontinuous Reception, DRX, retransmission timer upon expiry of the UL HARQ feedback timer.

2. The method of claim 1 comprising starting the UL HARQ feedback timer both if the wireless device performs a corresponding UL transmission or if the corresponding UL transmission is blocked by a Listen-Before-Talk, LBT, scheme.

3. The method of claim 1 further comprising remaining in DRX active time as long as the DRX retransmission timer is running.

4. The method of claim 1 further comprising stopping the UL HARQ feedback timer upon flushing a corresponding HARQ buffer.

5. The method of claim 1 wherein one UL HARQ Round Trip Time, RTT, timer and one DRX retransmission timer are maintained per a UL HARQ process.

6. A method of operation of a wireless device, comprising:
transmitting Uplink Control Information, UCI, on a cell operating in an unlicensed frequency spectrum, the UCI comprising:
Hybrid Automatic Repeat Request, HARQ, feedback information for multiple Downlink, DL, HARQ processes;
identifiers that identify the DL HARQ processes; and
receiving feedback control information from a base station serving the cell, the feedback control information comprising an indication of whether bundling of the DL HARQ feedback in the UCI is to be performed.

7. The method of claim 6 wherein the DL HARQ processes are identified by explicit identifier or by a bitmap wherein each bit corresponds to one of the DL HARQ processes.

8. The method of claim 6 wherein the feedback control information further comprises information that indicates a number of DL HARQ feedbacks that the wireless device is to bundle in the UCI.

9. A wireless device, comprising:
processing circuitry, memory and transceiver circuitry collectively configured to transmit Uplink Control Information, UCI, on a cell operating in an unlicensed frequency spectrum, the UCI comprising:
Hybrid Automatic Repeat Request, HARQ, feedback information for multiple Downlink, DL, HARQ processes; and
identifiers that identify the DL HARQ processes,
wherein the processing circuitry, memory and transceiver circuitry collectively configured to receive feedback control information from a base station serving the cell, the feedback control information comprising an indication of whether bundling of the DL HARQ feedback in the UCI is to be performed.

10. The wireless device of claim 9, wherein the one or more DL HARQ processes are identified by explicit identifier or by a bitmap wherein each bit corresponds to one of the DL HARQ processes.

11. The wireless device of claim 9, wherein the feedback control information further comprises information that indicates a number of DL HARQ feedbacks that the wireless device is to bundle in the UCI.

\* \* \* \* \*